(12) United States Patent
Venkatakrishnan et al.

(10) Patent No.: US 12,647,751 B2
(45) Date of Patent: Jun. 2, 2026

(54) METHODS FOR GEOGRAPHIC GESTURING USING A MOBILE DEVICE FOR INTERACTIONS WITH NEARBY OTHER MOBILE DEVICES

(71) Applicant: YellCast, Inc., San Carlos, CA (US)

(72) Inventors: Ganesan Venkatakrishnan, San Carlos, CA (US); Peter Ellenby, San Carlos, CA (US); Thomas William Ellenby, San Jose, CA (US); Peter Negulescu, San Francisco, CA (US)

(73) Assignee: YellCast, Inc., San Carlos, CA (US)

( * ) Notice: Subject to any disclaimer, the term of this patent is extended or adjusted under 35 U.S.C. 154(b) by 0 days.

(21) Appl. No.: 18/313,290

(22) Filed: May 5, 2023

(65) Prior Publication Data

US 2023/0276193 A1 Aug. 31, 2023

Related U.S. Application Data

(63) Continuation of application No. 17/027,630, filed on Sep. 21, 2020, now Pat. No. 11,770,673.

(Continued)

(51) Int. Cl.
| | |
|---|---|
| *H04W 4/021* | (2018.01) |
| *G06F 3/01* | (2006.01) |
| *G06F 16/22* | (2019.01) |
| *G06F 16/29* | (2019.01) |
| *H04M 1/7243* | (2021.01) |
| *H04M 1/72457* | (2021.01) |

(Continued)

(52) U.S. Cl.
CPC ............ *H04W 4/021* (2013.01); *G06F 3/017* (2013.01); *G06F 16/22* (2019.01); *G06F 16/29* (2019.01);

(Continued)

(58) Field of Classification Search
CPC ..... H04W 4/021; H04W 4/026; H04W 4/029; H04W 4/80; H04W 84/12;

(Continued)

(56) References Cited

U.S. PATENT DOCUMENTS

| | | |
|---|---|---|
| 10,133,751 B2 | 11/2018 | Fransen |
| 10,257,291 B1 | 4/2019 | Matiash |

(Continued)

OTHER PUBLICATIONS

International Search Report mailed Dec. 22, 2020 issued in PCT Application No. PCT/US2020/051881, pp. 1-2.

(Continued)

*Primary Examiner* — Marcos L Torres
(74) *Attorney, Agent, or Firm* — Haynes and Boone, LLP

(57) ABSTRACT

A method of secure communication interactions that comprise a communication via various communication modes. Example method comprises accepting an indication from a first user to communicate with a second user via a preferred communication mode, associating the indication with a unique identifier without revealing an identity of the first user, and in response to receiving a response from the second user, establishing a user-to-user communication channel for a particular communication mode selected from the preferred communication mode without requiring an identifier disclosing an identity of any user, and terminating the particular communication mode in response to determining that one user requests the termination of the particular communication mode to become a blocking user, wherein a future communication between the blocking user and any outside user is blocked based at least in part on the unique identifier.

11 Claims, 19 Drawing Sheets

Related U.S. Application Data

(60) Provisional application No. 62/903,631, filed on Sep. 20, 2019.

(51) Int. Cl.

| | |
|---|---|
| *H04W 4/02* | (2018.01) |
| *H04W 4/029* | (2018.01) |
| *H04W 4/80* | (2018.01) |
| *H04W 84/12* | (2009.01) |

(52) U.S. Cl.
CPC ..... *H04M 1/7243* (2021.01); *H04M 1/72457* (2021.01); *H04W 4/026* (2013.01); *H04W 4/029* (2018.02); *H04W 4/80* (2018.02); *H04W 84/12* (2013.01)

(58) Field of Classification Search
CPC ......... H04M 1/72403; H04M 1/72436; H04M 2250/12; H04M 1/7243; H04M 1/72457; G06F 3/017; G06F 16/22; G06F 16/29; G06Q 20/12; G06Q 20/32; G06Q 20/3224; G06Q 20/3226; G06Q 20/327
See application file for complete search history.

(56) References Cited

U.S. PATENT DOCUMENTS

| | | | |
|---|---|---|---|
| 2008/0231610 | A1 | 9/2008 | Hotelling et al. |
| 2009/0319181 | A1 | 12/2009 | Khosravy et al. |
| 2010/0210290 | A1 | 8/2010 | Riley et al. |
| 2010/0228612 | A1 | 9/2010 | Khosravy et al. |
| 2011/0032145 | A1 | 2/2011 | Hansen et al. |
| 2011/0082735 | A1 | 4/2011 | Kannan et al. |
| 2012/0075452 | A1 | 3/2012 | Ferren |
| 2012/0123860 | A1 | 5/2012 | Schrenk |
| 2012/0293440 | A1 | 11/2012 | Hotelling et al. |
| 2013/0074014 | A1 | 3/2013 | Ouyang et al. |
| 2013/0176865 | A1* | 7/2013 | Boland .............. H04L 65/1079 370/252 |
| 2014/0333530 | A1 | 11/2014 | Agnetta et al. |
| 2014/0365485 | A1 | 12/2014 | Kim |
| 2015/0019432 | A1 | 1/2015 | Burns |
| 2015/0058225 | A1 | 2/2015 | Matthews |
| 2015/0058939 | A1* | 2/2015 | Duong ............... H04L 63/0421 726/5 |
| 2018/0073889 | A1 | 3/2018 | Vigilante et al. |
| 2019/0114835 | A1 | 4/2019 | Costa et al. |
| 2019/0287083 | A1 | 9/2019 | Wurmfeld et al. |
| 2019/0361950 | A1 | 11/2019 | Ganesan et al. |
| 2020/0225760 | A1 | 7/2020 | Ofir et al. |
| 2022/0214185 | A1 | 7/2022 | Xiong et al. |

OTHER PUBLICATIONS

Kim Jee-Eun et al., "Mobile Applications for Assisting Mobility for the Visually Impaired Using IoT Infrastructure", Proceedings of 2014 TRON Symposium (TRONSHOW), T-Engine Forum (TEF), Dec. 10, 2014, pp. 1-6.

* cited by examiner

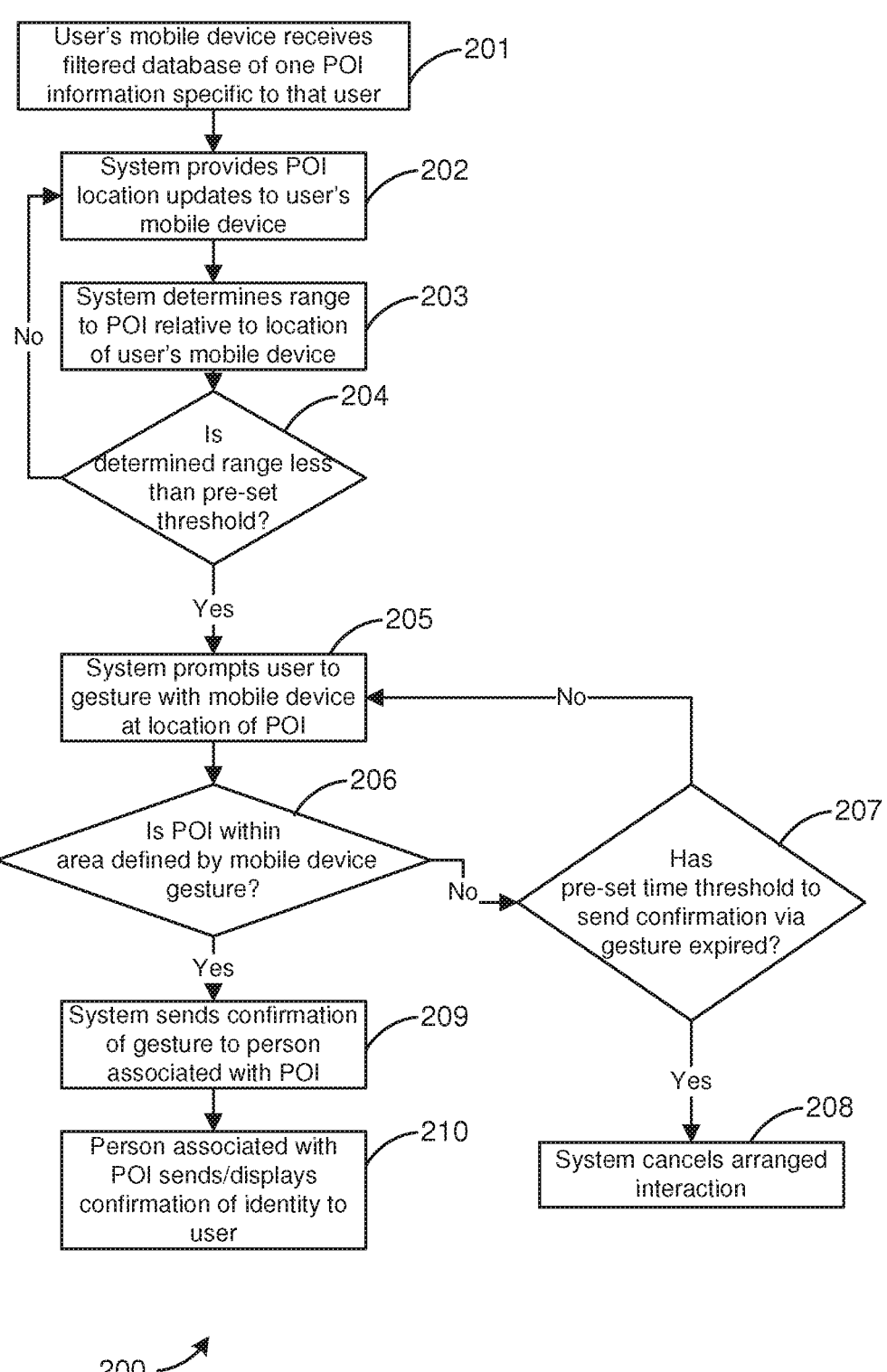

User's mobile device receives filtered database of one POI information specific to that user — 201

System provides POI location updates to user's mobile device — 202

System determines range to POI relative to location of user's mobile device — 203

Is determined range less than pre-set threshold? — 204

No

Yes

System prompts user to gesture with mobile device at location of POI — 205

No

Is POI within area defined by mobile device gesture? — 206

Has pre-set time threshold to send confirmation via gesture expired? — 207

No

Yes

Yes

System sends confirmation of gesture to person associated with POI — 209

System cancels arranged interaction — 208

Person associated with POI sends/displays confirmation of identity to user — 210

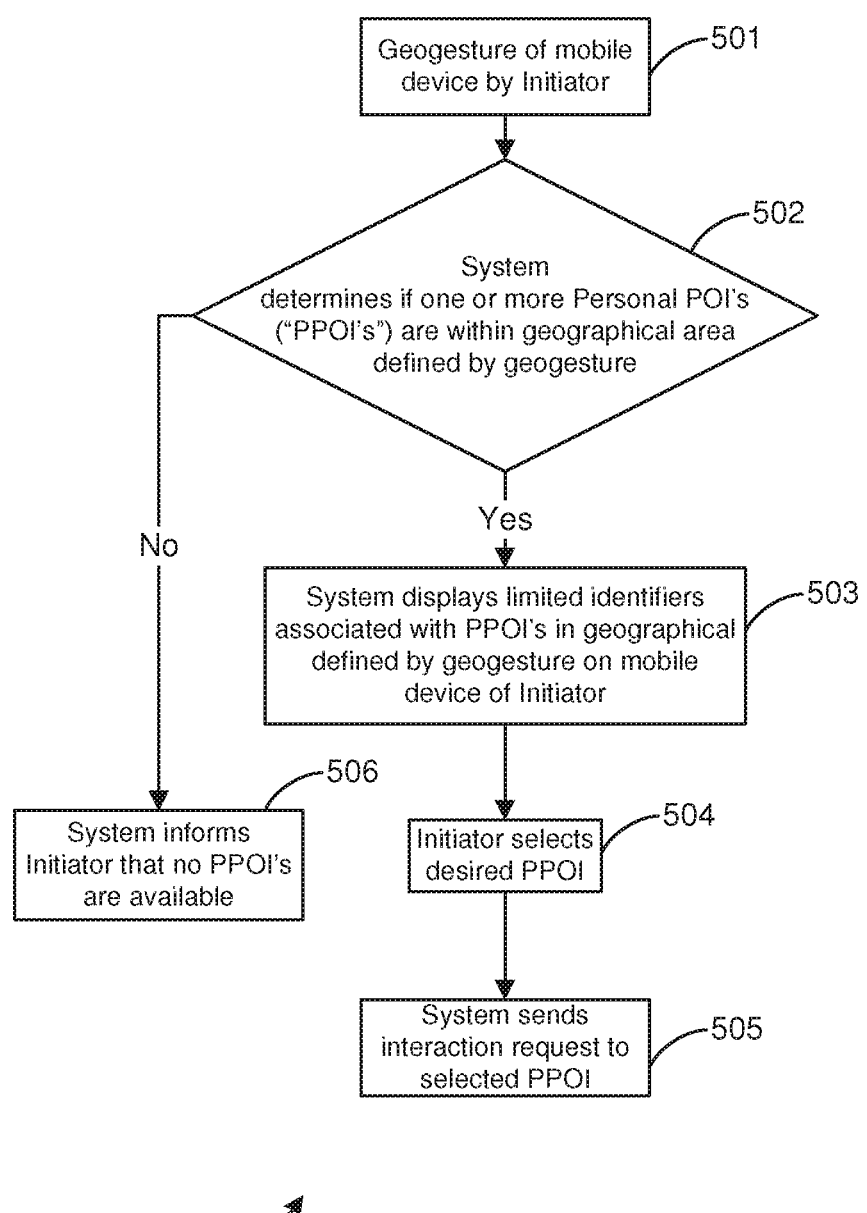

Geogesture of mobile device by Initiator — 501

System determines if one or more Personal POI's ("PPOI's") are within geographical area defined by geogesture — 502

No

Yes

System displays limited identifiers associated with PPOI's in geographical defined by geogesture on mobile device of Initiator — 503

System informs Initiator that no PPOI's are available — 506

Initiator selects desired PPOI — 504

System sends interaction request to selected PPOI — 505

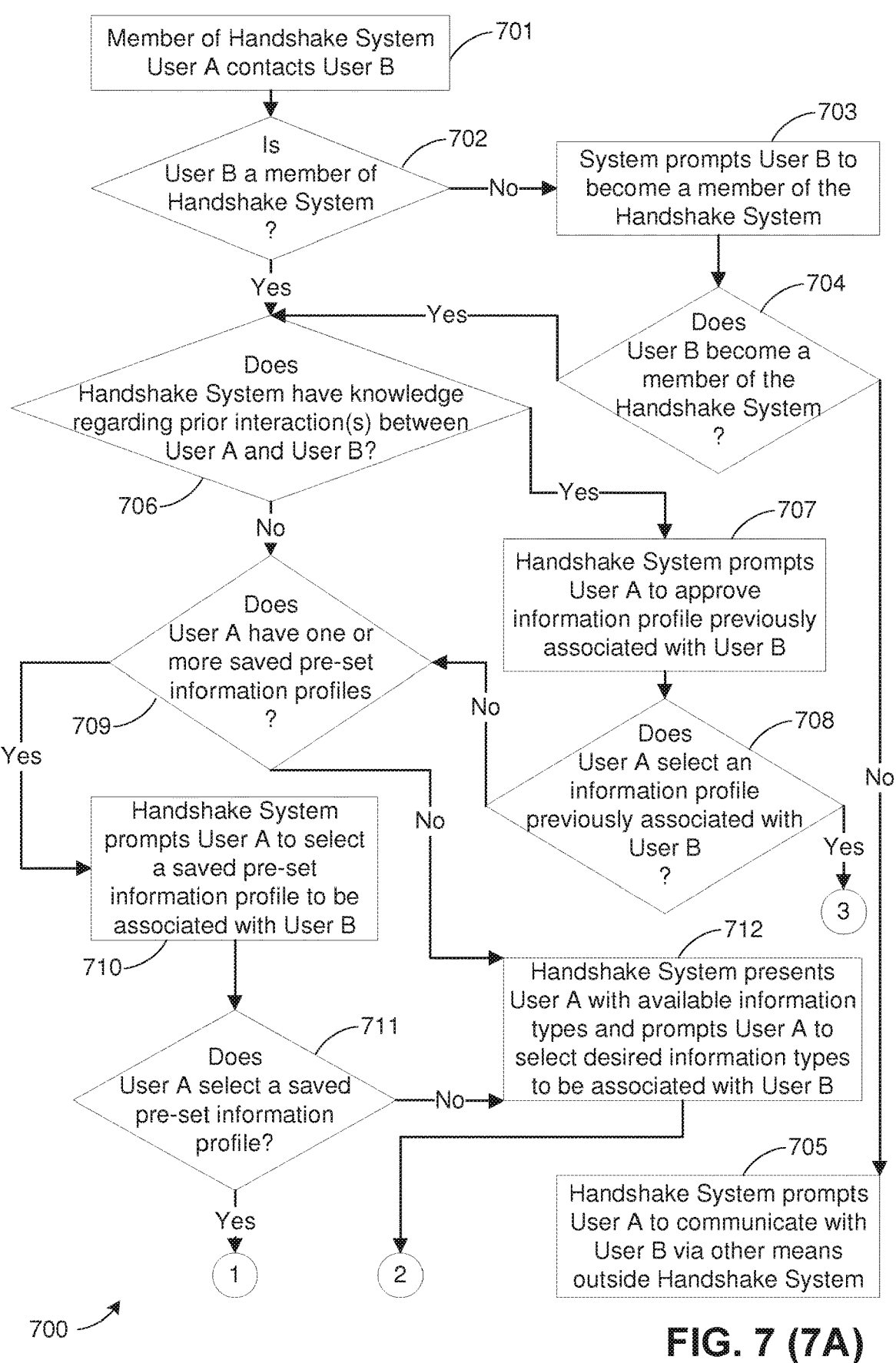
FIG. 7 (7A)

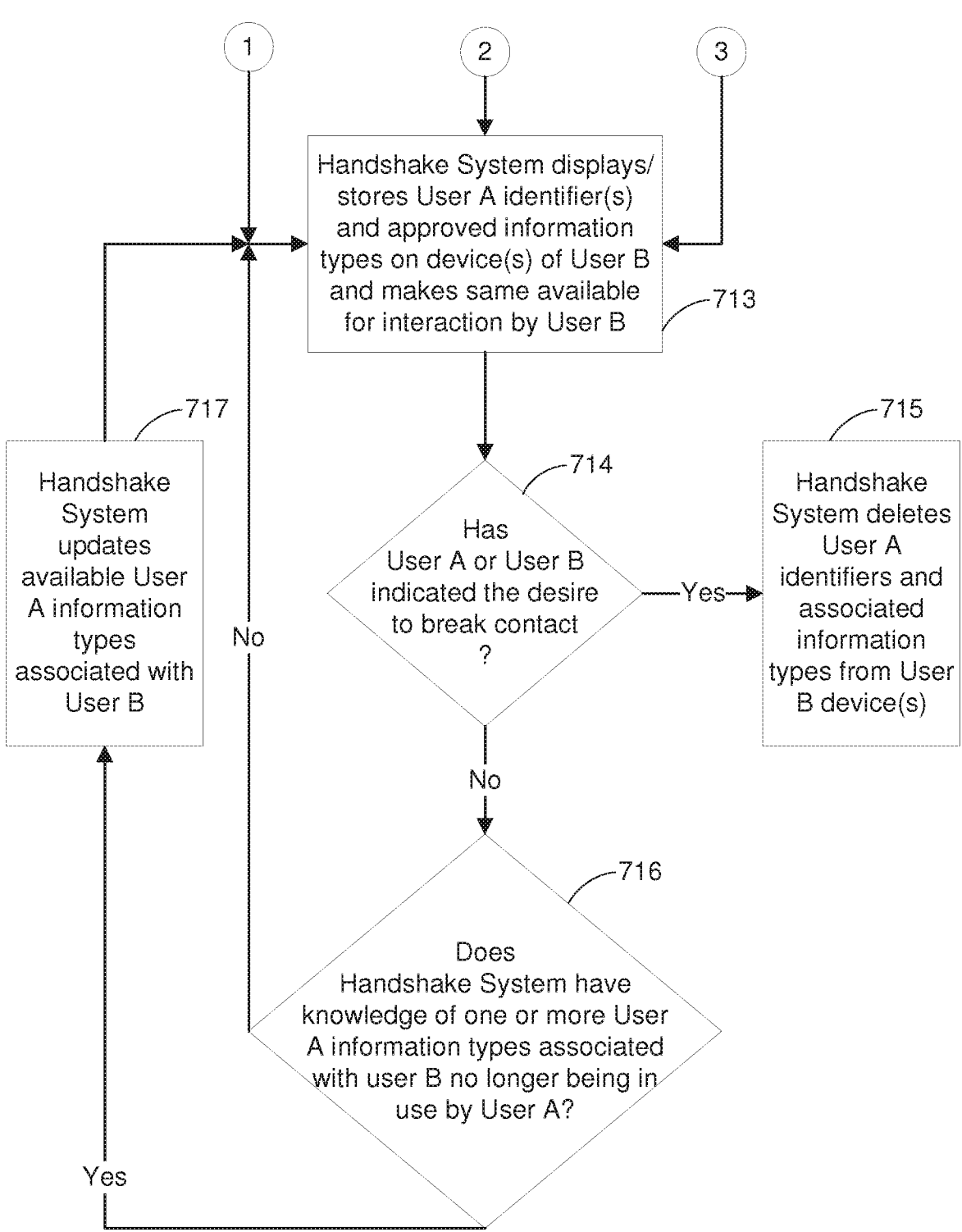
FIG. 7 (7B)

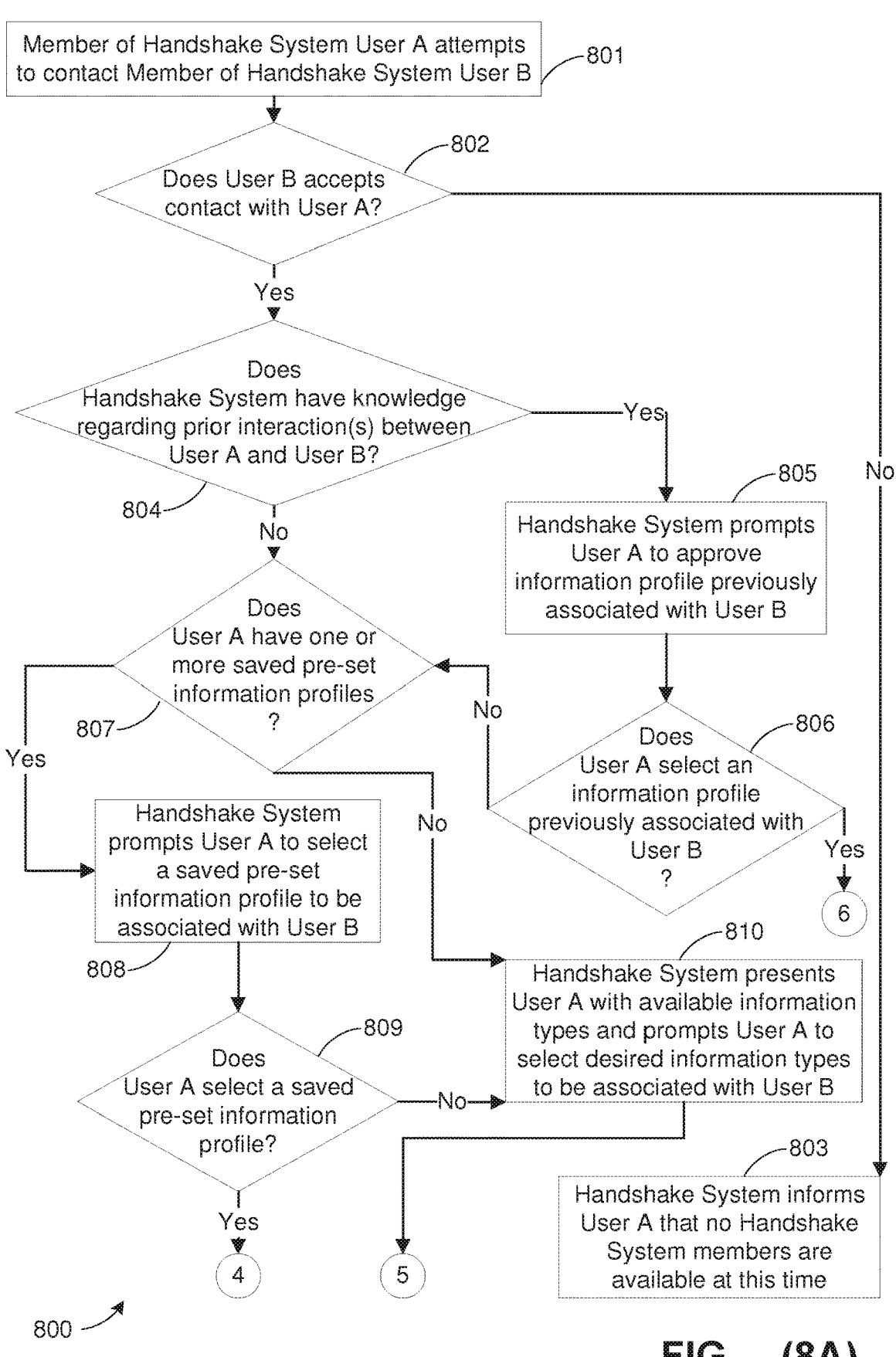
FIG. (8A)

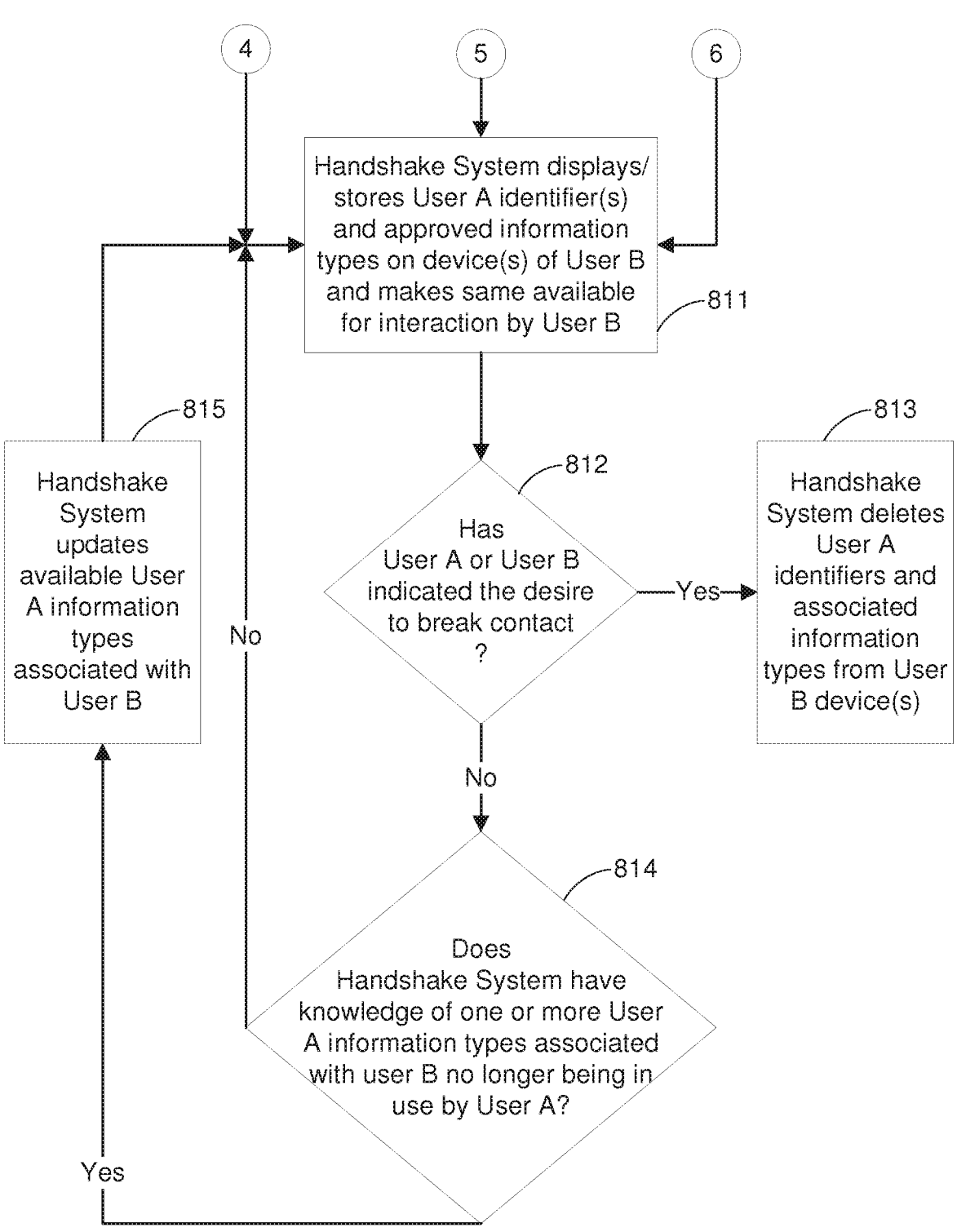
FIG. (8B)

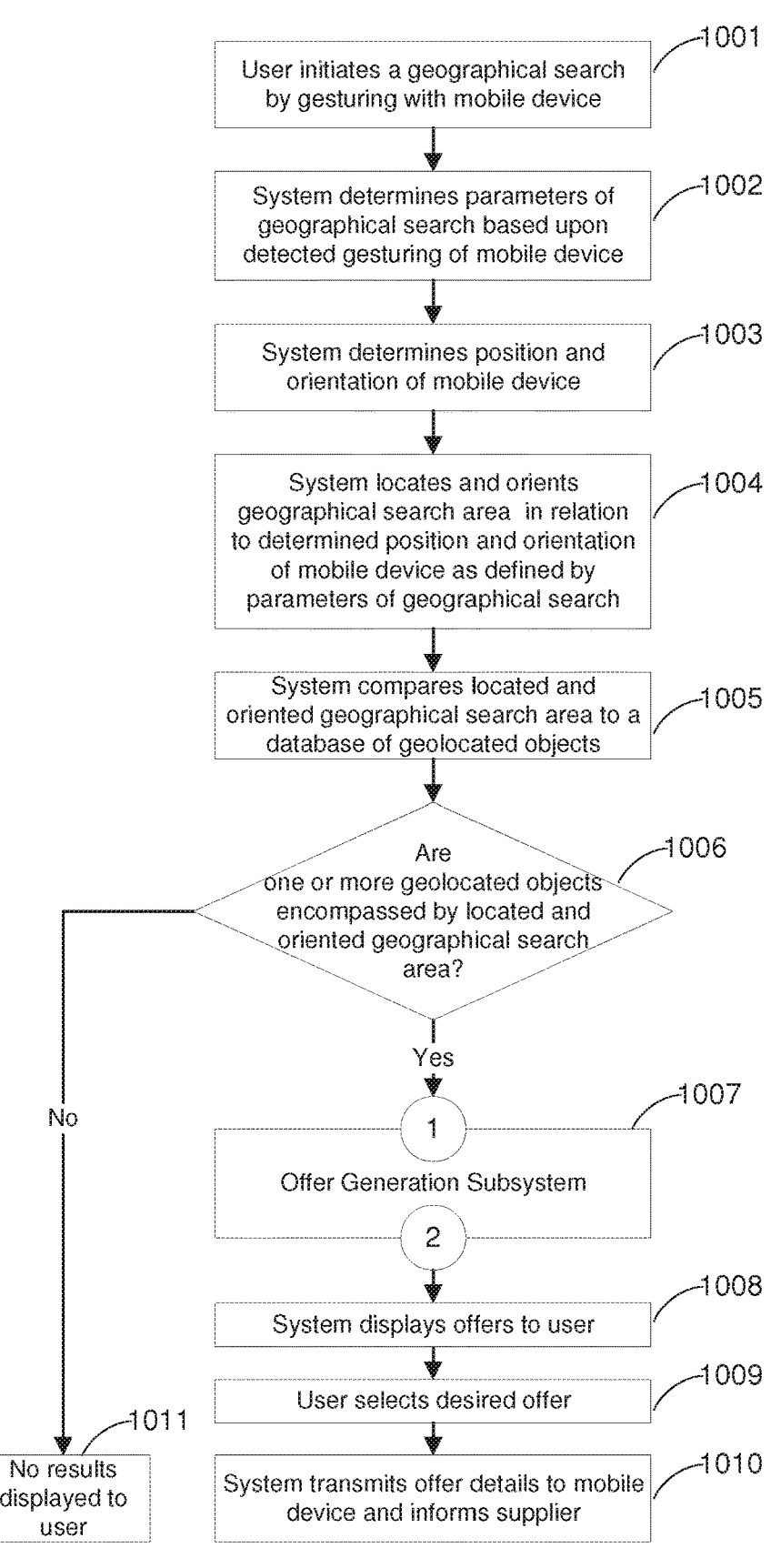

User initiates a geographical search by gesturing with mobile device —1001

System determines parameters of geographical search based upon detected gesturing of mobile device —1002

System determines position and orientation of mobile device —1003

System locates and orients geographical search area in relation to determined position and orientation of mobile device as defined by parameters of geographical search —1004

System compares located and oriented geographical search area to a database of geolocated objects —1005

Are one or more geolocated objects encompassed by located and oriented geographical search area? —1006

No

Yes

1

Offer Generation Subsystem —1007

2

System displays offers to user —1008

User selects desired offer —1009

No results displayed to user —1011

System transmits offer details to mobile device and informs supplier —1010

Requesting Payment:

1. Requestor gestures or taps to find nearby payers

2. Requestor selects payer from list of nearby users

3. Requestor sends payment request with note and/or photo

4. Payer receives notification of new payment request

5. Payer reviews request details and confirms payment

6. Requestor receives notification of payment

FIG. 14

Payer shops for items at Payee location —1601

Items are scanned at checkout —1602

Payer initiates CP App on mobile device —1603

Payer geogestures with mobile device —1604

Payee generates invoice and transmits same to Payer —1605

Payer pays invoice via CP App —1606

Payee receives confirmation of payment —1607

Payer receives confirmation of transaction and receipt —1608

1600

METHODS FOR GEOGRAPHIC GESTURING USING A MOBILE DEVICE FOR INTERACTIONS WITH NEARBY OTHER MOBILE DEVICES

CROSS-REFERENCE TO PRIORITY AND RELATED APPLICATION

This application is a continuation of U.S. patent application Ser. No. 17/027,630, filed Sep. 21, 2020, entitled "Methods for Geographic Gesturing Using a Mobile Device for Interactions with Nearby Other Mobile Devices", which in turn claims benefit of, and is a non-provisional of, U.S. Provisional Patent Application No. 62/903,631, filed Sep. 20, 2019, entitled "Methods of Point of Interest Data Creation, Geographic Gesture Based Verification, Social, Commerce and Security Actions and Interactions, Using Spatially-Aware Mobile Computing Devices."

This application incorporates by reference U.S. Pat. No. 8,527,357 entitled "Client and Server System for Coordinating Messaging Between Motivated Buyers and Listed Sellers" to Venkatakrishnan Ganesan (herein "Ganesan I"), and U.S. patent application Ser. No. 16/908,627, filed Jun. 22, 2020, entitled "Methods for Geographic Gesturing Using a Mobile Device for Interactions with Nearby Other Mobile Devices" naming Venkatakrishnan Ganesan (herein "Ganesan II").

The entire disclosure of the applications/patents recited above are hereby incorporated by reference, as if set forth in full in this document, for all purposes.

FIELD OF THE INVENTION

The present disclosure generally relates to gesturing with mobile devices. The disclosure relates more particularly to apparatus and techniques for performing geographically based gesturing and corresponding social actions and interactions.

BACKGROUND

Often people navigate unfamiliar or even familiar cities, towns, or other geographic regions while carrying a mobile computing device that can provide information and communicate with remote services to send and receive data, as well as provide location services as to the location of the mobile computing device relative to a coordinate system, such as a coordinate system in which landmarks, business locations, homes, points of interest, and the like can be located using coordinates in that coordinate system.

Sometimes, users of such mobile computing device will want to look up a point of interest (POI) or input data to add one to a POI database where one does not already exist. Also, such users might want to perform other actions using their mobile computing device.

Mobile devices have become, in places, ubiquitous and provide their users with information and connectivity. Some devices even find uses for effecting transactions with other nearby devices.

Improvements in geographically based interactions might be useful.

SUMMARY

A method of transaction processing might comprise obtaining gesture parameters based on a gesture at an initiator device of an initiator, deriving a gesture area from the gesture parameters, querying a point of interest (POI) database system for a matching set of POIs, wherein a POI of the matching set of POIs is a matching POI matching the gesture area when a POI location of the POI and the gesture area meet a matching requirement, providing the matching set of POIs, or information thereof, to the initiator device or a designee, identifying a selected POI from among the matching set of POIs, identifying a potential respondent device of a potential respondent associated with the selected POI, determining whether the potential respondent is to proceed with a transaction with the initiator and be a respondent, wherein the respondent interacts via a respondent device, obtaining transaction details from the initiator device, the respondent device, or both, and processing the transaction.

The respondent device might be a mobile device. The respondent device might be a business computer operated by or for the respondent.

The method might further comprise processing the transaction by determining parameters of a payment network, obtaining payment network details, formulating a payment network transaction, and emitting the payment network transaction into the payment network.

Identifying the selected POI from among the matching set of POIs might be based on initiator device input. Examples of transactions and interactions include social interactions and commerce interactions.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 2 is a flowchart illustrating a possible general mode of operation of a verification system.

FIG. 5 is a flowchart illustrating a possible mode of operation of a social interaction initiated with a geogesture.

FIG. 7 is a flowchart illustrating a possible mode of operation of the system, in which FIG. 7A shows a portion of a flow and FIG. 7B shows another portion of the flow.

FIG. 8 is a flowchart of an advanced mode of operation of the system, in which FIG. 8A shows a portion of a flow and FIG. 8B shows another portion of the flow.

FIG. 10 is a flowchart illustrating a possible mode of operation of the system.

FIG. 14 is a diagram illustrating methods of the system in operation via mobile devices.

DETAILED DESCRIPTION

Figure 1:
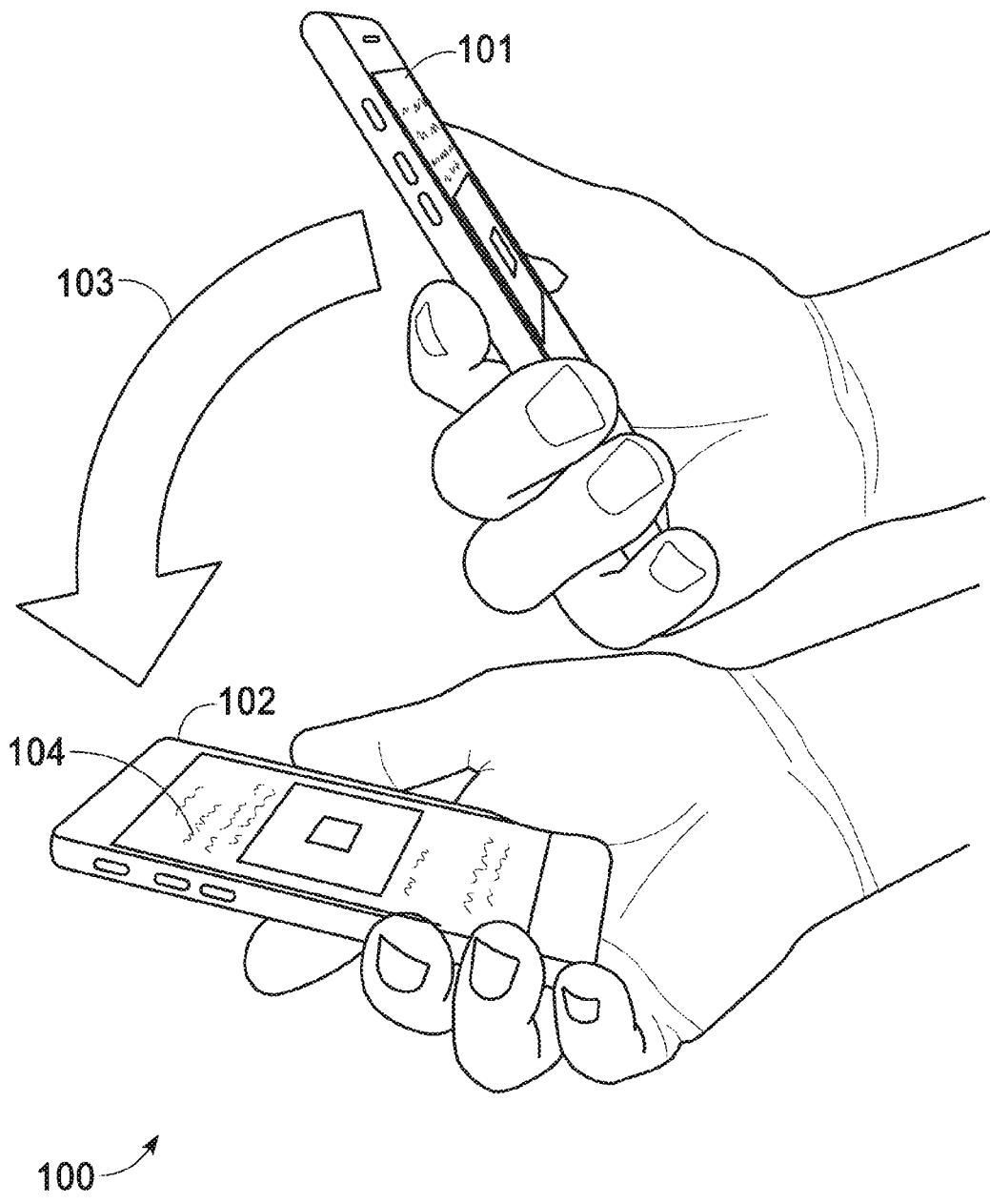
FIG. 1 is an image illustrating the physical motion of a gesture that can be interpreted as a cast or an act of casting.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

Using smart mobile devices, and other devices, users can take local geographically based actions and engage in interactions that are initiated by and based upon a physical gesture of a mobile device, generally a mobile phone or a tablet. A gesture might be deemed to have been made upon detection of particular movements or actions as might be determined by the mobile device's accelerometers, gyroscopes or other internal sensors used to determine a device's spatial state and/or motion, combined with that device's real world position as sensed by the mobile device's positioning sensors such as GPS, AGPS or other position sensing technology and the device's compass bearing (pointing direction) as determined by the mobile device's compass or other means of determining pointing direction. For example, by monitoring the compass and accelerometers of the mobile device, or other sensors that record the spatial situation of mobile devices such as smart phones and tablets, the mobile device can initiate a local geographically based action and/or interaction in a specific direction according to a user making a casting motion, much like a motion of casting a fishing rod, with their device. Other gestures, such as a side-to-side slashing motion, may also initiate geographically based actions and interactions in 360 degrees around a user. The actions and/or interactions may be in relation to points of interest ("POIs") that fall within a defined geographic area defined by the gesture. These POIs can be real world objects, such as buildings, restaurants, parks etc., mobile objects such as people, animals and vehicles, or virtual objects such as a geolocated gaming object. The various actions might be referred to as a "geogesture" of a mobile device. The geogesture might trigger the mobile device to take a geo-graphically based action and/or interaction in relation to specific POIs (objects, including a people) within the defined geographic area associated with the geogesture. The mobile device might create a data object for a geogesture, with data elements for the geographic area of the geogesture, the nature of the geogesture, and other details as explained herein.

System Overview

As various detailed examples will provide, transactions and interactions could be facilitated by connecting initiators with respondents, or at least potential respondents, where connections are based on matches that are based on gestures of initiators and locations of points of interest (POIs) of responders.

In a typical operation, an initiator—such as a person, a business entity, or other entity—at an initiating location performs a gesture using an initiator device that is a location-aware device or can be transformed effectively into one. The gesture can thus be a geogesture, a gesture that is used, or can be used, in specifying a geographic location relative to the initiator device. A geogesture server can be queried to identify a matching set of POIs and one or more of the matching set could be selected for a transaction. A respondent associated with a selected POI can respond, via a respondent device, or not. If the respondent responds, the geogesture server, or a component thereof, can connect the initiator device and the respondent device to allow them to negotiate terms of a geogesture transaction. The devices and/or the geogesture server can initiate a payment network transaction according to the terms of a geogesture transaction.

To "geogesture" an initiator having a location-aware mobile device that is geogesture-enabled, via software, an app, or other mechanism can perform a geogesture. A specific example of a geogesture might be to position at a particular location, point an initiator device in a particular direction, and make a casting motion to "cast" an area. The initiator device can capture gesture details in the form of gesture parameters (e.g., direction, location, speed of cast) that a geogesture server, or the initiator device itself, could process to compute a gesture area representing an area being gestured at by the initiator. A gesture area could be a bounded 2D geographic area with or without a vertical boundary, such a city block, a park, some distance along a street, an amount of acreage, etc., could have a vertical boundary, such as "the first three floors of a gestured-at building" or such. The geogesture could be a function of mobile device location, mobile device orientation, mobile device compass heading, and/or a measured amount of movement involved in a gesture. However this is done, a result is data in a computer system that represents the geogesture parameters that can define a gesture area.

A geogesture server might be used to convert from gesture parameters to a gesture area, and/or provide a matching set of POIs to go with the gesture area. A geogesture server might serve geogesture responses to geogesture requests, wherein a geogesture request includes (or specifies where to find) the geogesture parameters, and wherein a geogesture response includes (or specifies where to find or how to compute) a set of matching POI records. The geogesture server can run remote relative to the mobile device, run on the mobile device, or part local/part remote. A device might communicate with the geogesture server by using an API or sending texts or data to the geogesture server. Different functions of the geogesture server might be operated separately (such as a first subserver that just responds to geogesture requests, a second server that updates locations and/or manages a database of POIs, etc.).

A geogesture request might be stored in memory as illustrated in Table 1. A gesturer can be an initiator, but might also or instead be a respondent.

TABLE 1

Geogesture Request Data Structure

| Key Name | Value Type | Description |
|---|---|---|
| key | string | API key for a geogesturing application |
| id | string | ID for an API call (which can returned in responses to allow for matching requests and responses); might be up to 128 characters |
| cast_dist | number | Distance of cast in meters (default = 100) |
| cast_angle | number | Angle of cast in degrees (default = 30) |
| user_offset | number | Distance in meters behind the gesturer to include in the gesture area (default = 5) |
| nearby_dist | number | Distance in meters for including nearby POIs that do not exactly match the cast (default = 150) |
| lat | number | Latitude of gesturer's device's position |
| lng | number | Longitude of gesturer's device's position |
| compass_bearing | number | Compass bearing of the gesture's device in degrees from magnetic North |
| POIarray | array of objects | An ordered array of zero or more POI objects, keyed by "lat" and "lng" (latitude of POI, longitude of POI, respectively) |

In a specific embodiment, the fields "key," "lat," "lng," "compass_bearing," and "POIarray" are required and "id," "cast_dist," "cast_angle," "user_offset," and "nearby_dist" are optional, but other variations are possible. With a "user_offset" value, a geogesture might be positioned relative to a point behind the gesturer, to incorporate area just behind the gesturer.

The interface might be an Application Programming Interface ("API") for an application/system that handles requests and responses. The gesture might be structured as a JSON data structure having keys and key values and a request might be in the form of a JSON data structure sent to the geogesture server. An example is shown in Table 2.

TABLE 2

An Example Request Body in JSON

```
{
"key" : "4a1cb5d6de6165c7be152f4995de25be",
"id" : "3477656776568",
"cast_dist" : 0.36575999999999997,
"cast_angle" : 30,
"user_offset" : 0.0060959999999999999,
"nearby_dist" : 0.15239999999999998,
"lat" : 37.502989999999997,
"lng" : -122.256726,
"compass_bearing" : 53.73431396484375,
"pois" : [
{
"lat" : 37.505589999999998,
"lng" : -122.258926
},
{
"lat" : 37.330834027414518,
"lng" : -122.05693979758961
},
{
"lat" : 37.505089999999996,
"lng" : -122.257126
},
{
"lat" : 37.50009,
"lng" : -122.25392600000001
},
{
"lat" : 37.506889999999999,
"lng" : -122.260126
},
{
```

TABLE 2-continued

An Example Request Body in JSON

```
"lat" : 37.50029,
"lng" : -122.25992600000001
}
]
}
```

A geogesture server might maintain a database of POIs or have access to such a database. A POI database might include listings of presently active mobile devices and their locations and be updated as those devices move and/or include listings that specify POI location and other details, without the need for a device at that POI location. An example of the former might be a musician who has set themselves up as a POI in the POI database and is carrying a mobile device that supplies its present or recent location to the geogesture server, or perhaps to a third-party server (such as a social media or check-in server) with permissions for the geogesture server to use the location provided by the third-party server. An example of the latter is a business that provides data to the geogesture server, perhaps as a street address or coordinates of their place of business, which might be manually entered. A POI record in the POI database might be a record representing a point of interest in the POI database accessible by the geogesture server or that is part of the geogesture server. A POI record might include (or specify where to find or how to compute) a POI location for that POI, which is a geographic location, point, or area of the POI.

For example, the POI database might include POI records that have pre-specified locations, such as a business location (the POI might be an area, such as the area occupied by a business premises, the premises plus a perimeter range, a subset of the premises, point locations within the premises). The POI location might correspond to the interior of a shop, a specific point where a kiosk is located within a shop, or perhaps an area that includes points that are within a prespecified distance of a prespecified point location (e.g., the shop and points within 50 meters of the shop).

A POI record might be the location of a mobile device and the POI record might be updated as the mobile device moves. The location might only be updated when there is sufficient movement. Examples might include a mobile phone of a food truck operator that the food truck operator has associated with their food truck business, a mobile device that runs an app or otherwise communicates with the geogesture server and provides the geogesture server with the mobile device's location (real or proffered), a mobile device that communicates with a third-party service (social media, check-in apps) that provides the geogesture server with permission to access that third-party service to obtain a location for that mobile device and to update that mobile device's corresponding POI record, etc. In some instances, a party of interest in a POI record—such as a business associated with that POI—might install a fixed device that provides its location for use as a POI location for that POI.

In some cases, both an initiator and a respondent lack a fixed POI location but are nonetheless represented in the geogesture server. For example, two friends might be running geogesture enabled apps on their respective smartphones that allow for the geogesture server to respond to a request from an initiator friend's smartphone to indicate to the initiator that the other friend has their device within a gesture area and the initiator friend's smartphone app could signal that and ask the initiator if they would like to initiate a transaction or interaction with their friend. The geogesture server, or a subserver, could then send a message (such as via an app, a text, e-mail or message, etc.) to the other friend's device as a potential respondent. If the other friend chooses to continue, then the other friend's device can become a respondent device and the initiator device and respondent device can interact. The interaction might be mediated by the geogesture server or a subserver, or might be an interaction directly, or over a network independent of the geogesture server or subserver.

The geogesture server can match a gesture to POIs based on their respective locations, or approximations thereof. For example, since a gesture area is geographically located and a POI is geographically located, the geogesture server can identify which POIs in the POI database are within, or overlap, the gesture area. A POI might match a gesture area when the POI is within the gesture area or within a fuzzy boundary if that is how the geogesture server is configured.

The geogesture server might respond to a request (such as one formatted as in Table 1) with a response, such as one formatted as in Table 3.

TABLE 3

Geogesture Response Data Structure

| Key Name | Value Type | Description |
|---|---|---|
| id | string | Returning the ID received in the request |
| cast_polygon | array of objects | An array of objects, each object representing a point of a matching polygon with corresponding latitude "lat" and longitude "lng" |
| cast_matched | array | An ordered array of POI indices based on an inferred index (0, 1, 2, 3, . . . ) from the POIs |
| cast_nearby | array | An ordered array of POI indices based on an inferred index (0, 1, 2, 3, . . . ) from the POIs |

The response might be structured as a JSON data structure having keys and key values and a request might be in the form of a JSON data structure returned by the geogesture server. An example is shown in Table 4.

TABLE 4

An Example Response Body in JSON

```
{
"key" : "4a1cb5d6de6165c7be152f4995de25be",
{
"id" : "3477656776568",
"cast_polygon" : [
{
"lat" : 37.502989999999997,
"lng" : -122.2567262
},
{
"lat" : 37.503834027414518,
"lng" : -122.25672679758961
},
{
"lat" : 37.502834027414518,
"lng" : -122.25672679758961
}
],
"cast_matched" : [ 5,0,4],
"cast_nearby" : [ 1,3 ]
}
```

Once a particular initiator and a particular respondent are associated and/or connected, their respective devices can engage in a transaction. Since the association and connection can be done via the geogesture server, proximity is not required. This can be useful where social distancing is a requirement or expectation, thus allowing for ATM transactions, inter-person funds transfer, purchasing items at a point of sale, etc. all to occur at a safe distance.

A geogesture transaction might be represented by a data record that represents an interaction between an initiator device operated or controlled by an initiator (which can be a person or an entity) and a respondent device operated or controlled by a respondent (which can be a person or an entity. The respondent can be an actual respondent or, in the case of a refused transaction, no more than a potential respondent, where the geogesture transaction was initiated by the initiator device completing a geogesture. A geogesture transaction is completed when the initiator and the respondent agree to the essential terms and agree to have the geogesture transaction be processed.

Examples of types of geogesture transaction might include a funds offer, wherein the initiator offers funds to the respondent via their respective devices, so that the initiator is the payor and the respondent is the payee. Another example is paying for goods/services where the payor is to obtain goods/services via a side channel, such as in person or online. Yet another example is settling accounts for moneys owed by a payor to a payee. The initiator might be a prospective payee and the geogesture signaling an intent to make a funds request, such as where the initiator desires a transfer of funds from the respondent to the initiator via their respective devices, or a request from a provider of goods/services where the payee is to provide goods/services via a side channel. Another example is a request for settling accounts for moneys owed by the payor to the payee.

Yet another example is a request for funds transfer via a side channel from an account held by the respondent for the benefit of the initiator. This might be used where a bank account holder approaches an automated teller machine (ATM) and gestures toward the ATM. If the ATM is within the gesture area and the geogesture server has a POI record for that ATM, the gesture could lead to an app on the initiator's smartphone connecting to a bank computer system that could initiate a withdrawal of funds from the back about and output a corresponding amount of cash from the ATM so that the initiator need only touch the cash and not the rest of the ATM.

Other examples include transfer of a digital good or content (in either direction, initiator→respondent or respondent→initiator, digital media transfer, transfer of a right to some benefit (e.g., coupon, discount, access), or the like.

A geogesture transaction gateway might be one or more computers organized to generate and initiate a payment transaction in the payment network based on a completed geogesture transaction. A payment network might be a collection of computers, some conventional and existing, for processing a payment transaction between parties, such as a bank, an automated clearinghouse, a credit card network, an ATM network, a blockchain systems, and/or a loyalty account management system.

Geographic Gesture Based Verification, Social, Commerce and Security Actions and Interactions A geogesture can trigger a geographic-based action and/or interaction initiated by or based upon a physical gesture of a mobile device. The gesture parameters can be computed based on the mobile device's accelerometers, gyroscopes or other internal sensors used to determine a device's spatial state and/or motion. Combined with that device's real-world position as sensed by the mobile device's positioning sensors such as GPS, AGPS or other position sensing technology and the device's compass bearing (pointing direction) as determined by the mobile device's compass pointing direction sensor, this can be used to make a geogesture.

For example, by monitoring the compass and accelerometers of the mobile device, or other sensors that record the spatial situation of mobile devices such as smart phones and tablets, one can initiate a local geographic based action and/or interaction in a specific direction by making a casting motion. In one example, a gesture comprises a casting motion using the mobile device, as with the casting a fishing rod. Other gestures, such as a side to side slashing motion, may also initiate geographic based actions and interactions around a user. The actions and/or interactions may be in relation to points of interest ("POIs") that fall within a gesture area that is defined by, computed from, and/or represented by gesture parameters determined from the gesture. These POIs can be real world objects such as buildings, restaurants, parks etc., mobile objects such as people, animals and vehicles or virtual objects such as a geolocated gaming object. A geogesture might be a precursor to a geographic based action and/or interaction being made possible in relation to specific POIs (objects, including a people) within the defined geographic area of the geogesture.

FIG. 1 is an image 100 illustrating the physical motion of a cast. In FIG. 1, a mobile phone is shown in two positions, at the start of a cast 101 and the end of a cast 102. The motion between the two positions is shown as an arrow 103. As shown, the motion is in the vertical plane. In some implementations, motion in the horizontal plane may trigger a cast. This motion may be registered as the rate of change through the angle traversed, the actual angular change, or a combination of the two. The results of the search for the cast then may be displayed on the screen 104 of the electronic device. If the motion does not meet a threshold (e.g., rate of change of angular motion) in the horizontal and/or vertical planes, the motion may not register as a cast and thus the motion may be ignored. The threshold may be pre-defined or pre-set. In one or more implementations, the threshold is dynamically determined based on typical movement of the device.

Verification Actions and Interactions Initiated with a Geogesture

In one example use, the gesture is initiated by an initiator to effect a rendezvous, by gesturing a gesture area, selecting a POI that is associated with the rendezvous target. A person having a mobile device can use that mobile device to arrange for a rendezvous entity at a pre-specified rendezvous location. The rendezvous entity can be another person, a vehicle, a public transport service or a place, wherein the person is to arrive or be at the specified rendezvous location in order to engage in an activity at the specified rendezvous location with the rendezvous entity. The mobile device might have a capability of communicating with a device associated with the rendezvous entity and a capability of determining the mobile device's geographic location relative to the specified rendezvous location. Examples of such activities might include being a passenger in a vehicle, driving to pick up a passenger, meeting a person not previously introduced, boarding public transport, etc.

The person, using their mobile device, performs a gesture that triggers a communication that in turn triggers an action of the device associated with the rendezvous entity to signal to the person and identify the rendezvous entity when in the proximity of the specified rendezvous location.

In a specific example, a rideshare passenger might make a gesture towards a vehicle to determine whether that vehicle is operated by a driver that a rideshare service has assigned to pick up that rideshare passenger, thereby allowing the rideshare passenger to identify and verify the correct vehicle. In another, two people meeting at a location who do not know each other could each gesture and use that to identify themselves to each other. In another example, a person could gesture at the entrance to a venue and receive verification that they are at the correct entrance.

FIG. 2 is a flowchart 200 illustrating a possible basic mode of operation of the system. In step 201 the mobile device of the user receives the filtered database of POI information from the system that is specific only to that user for a specific time period. The flowchart then branches to step 202. In step 202 the system provides updates as to the current location of the POI. The flowchart then branches to step 203. In step 203 the system determines the range from the location of the user's mobile device to the current location of the POI. The flowchart then branches to step 204. In step 204 the system determines if the determined range is less than a pre-set range threshold. For example, in the ride share scenario this range threshold may be 50 m. If the determined range is not less than the pre-set threshold the flowchart branches back to step 202. If the determined range is less than the pre-set threshold the flowchart branches to step 205. In step 205 the system prompts the user to geogesture at the location of the POI. The flowchart then branches to step 206. In step 206 the system determines if the current POI location is within the geographical area defined by the geogesture of the user's mobile device.

If the current POI location is not within the geographical are defined by the geogesture of the user's mobile device the flowchart branches to step 207. If the current POI location is within the geographical area defined by the geogesture of the user's mobile device the flowchart branches to step 209. In step 207 the system determines if a pre-set time threshold to send confirmation via gesture has expired. An example of such a time threshold may be that the user is given five minutes from the time the location of the POI comes within range to gesture at the location of the POI. If the system determines that the pre-set time threshold has not expired the flowchart branches back to step 205. If the system determines that the pre-set time threshold has expired the flowchart branches to step 208 and the arranged interaction is cancelled. Examples of arranged interactions may be, but are not limited to, car rideshare reservations, service appointments such as plumbers and electricians, deliveries, etc. In step 209 the system sends confirmation of the geogesture to the person or vehicle associated with the POI. The flowchart then branches to step 210. In step 210 the person or vehicle associated with the POI sends or displays confirmation of identity to the user.

In a specific embodiment, a geogesture is used for verification in the process of booking a ride share car journey. Consider a person at a hotel needing a car to take them to the airport. They might proceed to a sidewalk in front of their hotel with their luggage and launch their ride share app on their mobile device and request a car. After a few moments, they might be informed that a car is on the way and they are provided with the name and a photograph of the driver, the make and color of the car long with the car's license plate. Along with this information they are also shown the location of the car on a map. The geogesture server might maintain a POI record for the car and the person could connect using a gesture as explained herein. Once the car arrives, the person might be prompted to geogesture towards the car. Since the geogesture-enabled app is aware of the POI and respondent of the gesture, it can show the assigned car on a display for confirmation of the correct car. If it is not their assigned car, no results from the search are shown and the user will then know that they possibly were about to get into the wrong car. The system could also alert the vehicle, and driver, that it had been geogestured at by the proper user. The interaction with the assigned car with the geogesture verifies that the user will only get into their assigned car. The same methods could be used to verify that one was boarding the correct bus, ferry or train, or was at the correct gate at the airport.

Once the user has geogestured towards the car, or other mode of transit they wish the verify is their correct vehicle, is it possible that the vehicle could react in some manner to the geogesture. The system would again alert the vehicle, and driver, that it had been geogestured at by the proper user and this would trigger a response from the vehicle. The headlights would flash, or the interior lighting could change color, for example. Another reaction from the vehicle would perhaps be to play a specific song, chosen by the user, on the vehicle's sound system. That way when the user enters the vehicle and hears they song they are given a second level of verification that they are entering the correct vehicle. The reaction from the vehicle may be a generic one, such as the headlights flashing, or may be customized by the user; flash the lights three times, for example.

It may also be that each car has its own unique reaction to being geogestured at and the user would be given this information, what the specific reaction the car will make to the geogesture, as well as the information about the car stated in the previous example. For instance, one car my honk the horn briefly and flash the headlights twice to verify to the user that is indeed their vehicle, and another car may dim the interior lighting and then have it brighten in a specific color. There may also be proprietary equipment provided to the driver by the ride share company, such as lights that point out of the windshield from the dashboard, that provide the reactions to the geogesture.

It may also be the case that the driver of the vehicle geogestures towards the location of the rider to verify that it is the rider who the car has been assigned to. The rider would be informed that they had been geogestured at by the driver, providing additional verification that it is the correct vehicle. The rider may also be instructed to perform some motion, perhaps a single clap, to verify to the driver that they are the assigned rider. It may also be that the rider's mobile device reacts in some manner after being geogestured at. The screen could turn completely red and then the user would hold up their phone for the driver to see, or the flash/flashlight on the device could flash several times and the driver would see this reaction to the geogesture once again confirming that it is the correct rider. Again, these reactions could be generic, or could be customized to the car or the rider. For example, there is a rider whose mobile device always will display the logo of their favorite sports team in full screen once they have been geogestured at. These interactions can provide additional verification that rider and vehicle are properly matched before the rider enters the vehicle. Again, these methods could be used for a variety of transportation modes.

It may also me the case that cars may have large screens that display rider specific graphics or images once they have been geogestured at, or that cars in the future can have luminous paint that may be able to change colors or act as a screen that covers the entire vehicle and would display rider specific graphics or a specific color once the car has been geogestured at by the user, thus verifying it was the correct vehicle for the passenger. It can be imagined that a multitude of other physical responses from the vehicle after it had been geogesture at could be used to verify the vehicle to the user.

Figure 3:
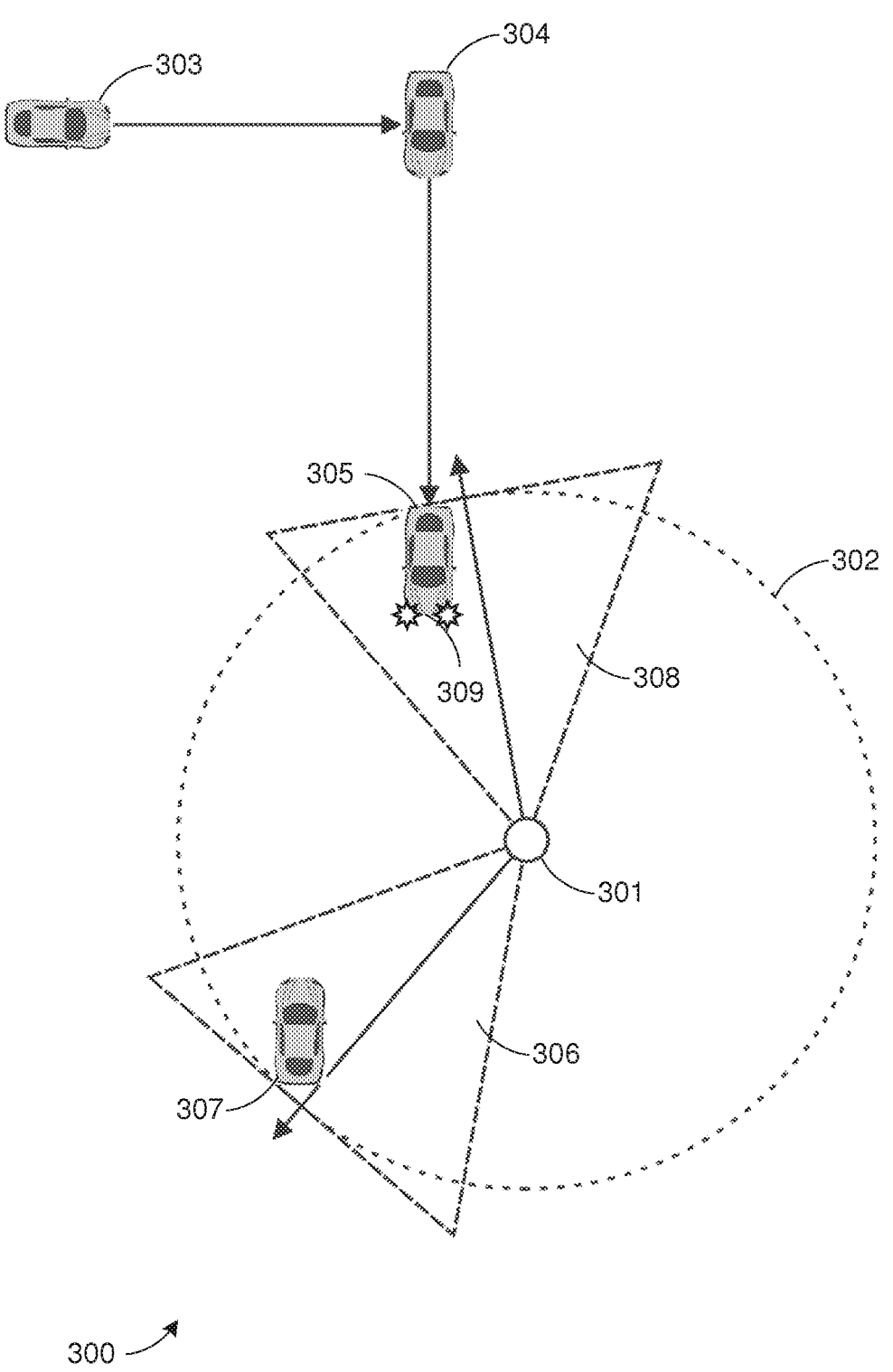
FIG. 3 is a diagram, in plan view, illustrating a possible mode of operation of a verification system in relation to a ridesharing application.

FIG. 3 is a diagram 300 in plan view, from above, illustrating a possible mode of operation of the system in relation to a ridesharing application. A user of the system at location 301 requests a rideshare vehicle and a vehicle is assigned to that user. The system then generates and transmits a filtered single POI database comprising the updated location of the assigned vehicle to the mobile device of the user of the system. The vehicle moves along a route from location 303 to 304 and then from location 304 to 305. As the vehicle location is being updated the system determines the range from the user's position 301 to the current position of the vehicle and compares this determined range to a range threshold 302 that might be pre-set. It should be noted that for clarity the user's position is stationary for this example but the user's position may be dynamic and the user may be moving, as the system determines the relative range. When the vehicle is at location 303 the determined range is greater than the range threshold 302. The same is true for location 304. At location 305 the determined range to the vehicle is less than the range threshold 302 and the user is then prompted to geogesture at the vehicle. In this example the user initially geogestures at a different vehicle at location 307. The system determines that the lone POI comprising the user specific filtered database of one POI is not encompassed by the geographical area 306 defined by the users initial geogesture and the user hence receives to confirmation response from that vehicle. The user therefor knows that this is not the vehicle they have reserved and should not get into that vehicle. The user then geogestures at the correct vehicle at location 305. The system determines that the lone POI comprising the user specific filtered database of one POI is indeed encompassed by the geographical area 308 defined by the users second geogesture. The system then instructs the assigned vehicle to send or display the pre-arranged confirmation of identity to the user, in this case a pre-arranged sequence of headlight flashes 309.

Figure 4:
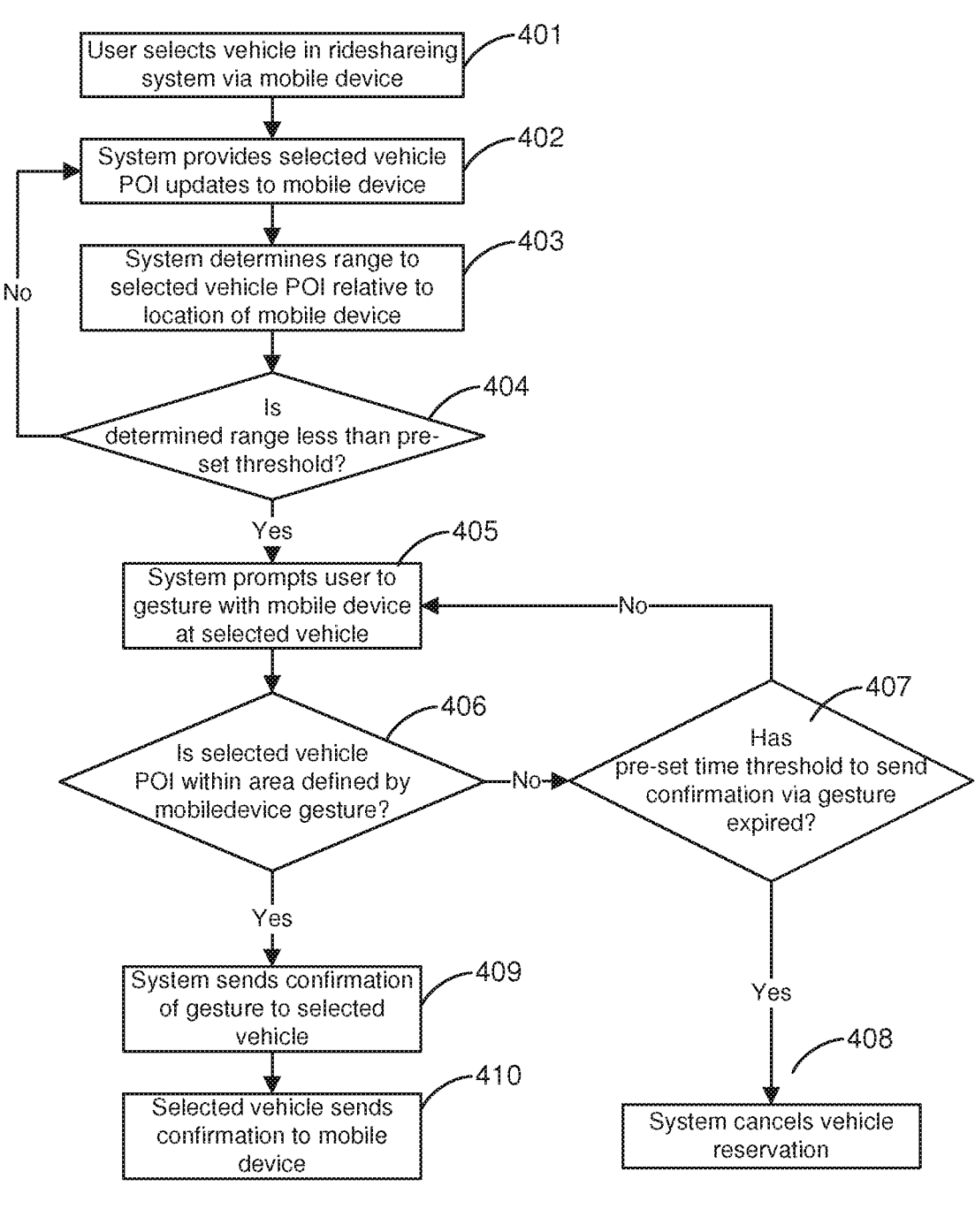
FIG. 4 is a flowchart illustrating a possible mode of operation of a verification system in relation to a ridesharing application.

FIG. 4 is a flowchart 400 illustrating a possible mode of operation of the verification system in relation to a ridesharing application. In step 401 the user of the system selects a vehicle via a ridesharing application running on a mobile device. The flowchart then branches to step 402. In step 402 the system provides updates as to the current location of the vehicle POI. The flowchart then branches to step 403. In step 403 the system determines the range from the location of the user's mobile device to the current location of the vehicle POI. The flowchart then branches to step 404. In step 404 the system determines if the determined range is less than a pre-set range threshold. For example, in this rideshare scenario this range threshold may be 50 m. If the determined range is not less than the pre-set threshold the flowchart branches back to step 402. If the determined range is less than the pre-set threshold the flowchart branches to step 405. In step 405 the system prompts the user to geogesture at the location of the vehicle POI. The flowchart then branches to step 406. In step 406 the system determines if the current vehicle POI location is within the geographical area defined by the geogesture of the user's mobile device. If the current vehicle POI location is not within the geographical are defined by the geogesture of the user's mobile device the flowchart branches to step 407. If the current vehicle POI location is within the geographical area defined by the geogesture of the user's mobile device the flowchart branches to step 409. In step 407 the system determines if a pre-set time threshold to send confirmation via gesture has expired. An example of such a time threshold may be that the user is given five minutes from the time the location of the vehicle POI comes within range to gesture at the location of the vehicle POI. If the system determines that the pre-set time threshold has not expired the flowchart branches back to step 405. If the system determines that the pre-set time threshold has expired the flowchart branches to step 408 and the vehicle reservation is cancelled. In step 409 the system sends confirmation of the geogesture to the driver of the vehicle. The flowchart then branches to step 410. In step 410 the driver of the vehicle initiates the confirmation of identity by sending or displaying confirmation of identity to the user.

A verification-based geogesture action and interaction might be useful where many people are waiting for ride share cars in the same place or area. For example, suppose 100 people get out of a movie theater and 30 of them are waiting for ride share cars, while ten cars are already waiting for riders. Multiple prospective riders can geogesture towards the cars at the same time, but the gesturing rider devices can be associated correctly with their respective rides and their device can provide a unique display to indicate which car is which. The rider can then push the icon of the matched car. The system matches rider and sends a blink or flash that appears on the driver's phone. At that point blinking the cars light would confirm exact car for each rider. If the driver physically sees the rider cast and the icon appears on his phone, they know the exact rider. If other riders cast at the same time or other cars blink at the same time, there is no way to confirm except with a second action of the same, offset by time where the probability of overlap is therefore reduced.

The previously described methods may also be useful for verifying that one was using the correct entrance to a large building or sporting arena. Or that the restaurant (or other establishment) they were about to enter was the one they had made a reservation at. This would be especially helpful to users who found themselves in a place where the signs were not in their native language.

The previously described methods could also be useful in personal interactions that required some sort of verification, a blind date, for example. It would be the digital version of "I'll be wearing a red carnation." A user would geogesture at who they thought they were supposed to meet and once geogestured at, the other user's mobile device, for example, display an image of a heart that they would hold in the air to signal that they were indeed the person the initial user was supposed to be meeting.

Another use of a geogesture for verification would be for a consumer who has booked an in-home appointment with a service provider such as a cable television company or a plumber to verify that they are a legitimate representative of that service provider. The service provider would dispatch a vehicle and the technician to the house and track the vehicle, either using the technician's mobile device as determined by its positioning technology or an in-vehicle positioning means (or perhaps both therefore tracking the vehicle and also the technician), on its route. They would provide this location information to the customer, creating a POI database comprising the technician's location or the vehicles' location. If they were both being used then both would be provided to the customer. Once the vehicle arrives at the customer's home the customer would be alerted. They would then perform a geogesture in the direction of the vehicle. If the vehicle was not present in the resulting search then the vehicle is not genuine. If it is present in the results of the search the vehicle has been verified as being genuine. The geogesture to perform the verification process could be initiated without the user having tracked the vehicle route or being alerted to its arrival but performed when the user sees the vehicle arrive at the house, or the technician rings the doorbell. The same verification scheme could be used not only on the vehicle but also the technician once they exit the vehicle.

Examples of Social Actions and Interactions Initiated with a Geogesture

In a specific example, a user of a mobile device having an app or functionality of geogesturing might find themselves in a city with bars and restaurants. From a place near a bar of possible interest, the user might geogesture towards the bar using their mobile device. This might cause the mobile device to generate a geogesture data object, look up data based on a location area element of the geogesture data object and display information about points of interest within that location area, presumably including the bar of possible interest. The mobile device can use that geogesture data object and query a remote server that can return details of the user's friends who are noted in a database at the remote server and who's devices have indicated that they are presently within the location area. A social network might be set up among those friends, where the user's friends have allowed the social network, or other friend finder app, to track their location and include them as POIs that may be interacted with. The user can then send a group message, facilitated perhaps by the remote server, to the friends. The geogesture data object might be used for a more complex query, such as identifying how many of the user's contacts are in each different establishment that falls within the location area.

In another example, the user is already within an environment and notes a group of interesting people across the room. The user can initiate a geogesture towards the group and the query with the remote server can return data as to which of those people are within the group and on the same social network or networks as the user, and who have allowed the social network to track their location and include them as POIs in the user database. It may be the case that all of those who meet the criteria are displayed to the user and the user may then initiate actions, including but not limited to, profile views and friend requests. It may also be the case that only those who have a mutual friend in common, or other similar attribute including but not limited to, same college, work experience or musical taste, with the user are shown to the user. Then the user may initiate actions and interactions with them as previously described or other actions and interactions such as text chatting or sending a photograph through the social network. It may also be the case that those who were geogestured at may have to approve that their profile be shown to the user who initiated the interaction. They would be shown who the user was and then they may approve that actions or interactions occur or they may choose to initiate an action or interaction with the user. Similarly, if the user were to initiate a 360-degree geogesture at the same party, the guests within the defined area of the geogesture who fit the previously defined parameters would be available for the user to interact with in the same methods as previously described. Users of the system who have approved being in the POI database may have user profiles that allow other users who geogesture at them to interact with them in a predefined manner, including but not limited to filtering not at all, or filtering by demographics.

Instead of a remote server, a peer-to-peer network might be used, or a system with distributed data records, such as a blockchain system. The peer-to-peer network might be, for example, a Wi-Fi Direct™ network, a Bluetooth-based network, etc.

FIG. 5 is a flowchart 500 illustrating a possible mode of operation of a social interaction (the "POI server system") initiated with a geogesture. In step 501, an initiator of an interaction, who is a user of the POI server system, geogestures at a group of people with their mobile device. The flowchart then branches to step 502. In step 502, the POI server system determines if the location of one or more Personal POIs ("PPOIs") associated with members of the same social or professional network, or a subset of that social or professional network such as a friends group, as the initiator are located within the geographical area defined by the geogesture of the initiator's mobile device. If one or more PPOIs are not located within the geographical area, the flowchart branches to step 506 in which the POI server system informs the initiator that no PPOIs are available for interaction. If one or more PPOIs are located within the geographical area, the flowchart branches to step 503. In some embodiments, POIs and PPOIs can be processed similarly using the same processes, just perhaps filtered differently at times.

In step 503, the POI server system displays a limited identifier, such as a picture, first name, etc., associated with each PPOI within the geographical area on the mobile device of the initiator. The flowchart then branches to step 504. In step 504, the initiator selects the desired PPOI that they would like to interact with. The flowchart then branches to step 505. In step 505, the POI server system sends an interaction request to the social network member associated with the selected PPOI.

Figure 6:
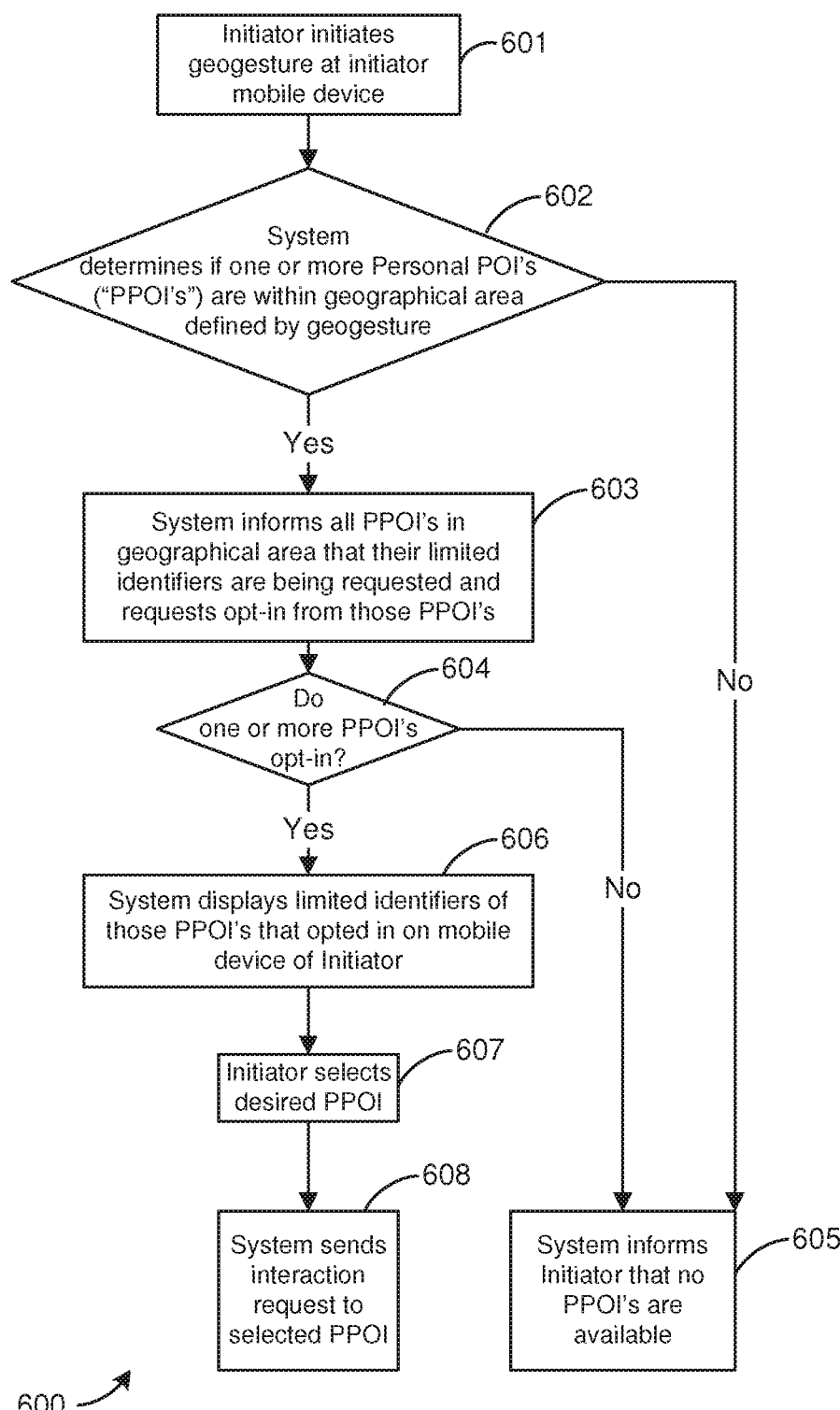
FIG. 6 is a flowchart illustrating a mode of operation of a social interaction initiated with a geogesture.

FIG. 6 is a flowchart 600 illustrating a more advanced possible mode of operation of a social interaction initiated with a geogesture using the POI server system. In step 601, the initiator geogestures at a group of people with their mobile device. The flowchart then branches to step 602. In step 602, the POI server system determines if the location of one or more PPOIs associated with members of the same social and/or professional network, or a subset of that social or professional network such as a friends group, as the initiator are located within the geographical area defined by the geogesture of the initiators mobile device. If one or more PPOIs are not located within the geographical area the flowchart branches to step 605 in which in which the POI server system informs the initiator that no PPOIs are available for interaction. If one or more PPOIs are located within the geographical area the flowchart branches to step 603. In step 603, the POI server system informs members whose PPOI location is within the geographical area that their limited identifiers, such as a picture, first name, etc., are being requested and requests opt-in from each such members. The flowchart then branches to step 604. In step 604, the POI server system determines if one or more such members opt-in. If one or more such members do not opt-in the flowchart branches to step 605 in which the POI server system informs the initiator that no PPOIs are available for interaction. If one or more such members do opt-in, the flowchart branches to step 606. In step 606, the POI server system displays the limited identifier associated with each member that opted on the mobile device of the initiator. The flowchart then branches to step 607. In step 607, the initiator selects the desired PPOI that they would like to interact with. The flowchart then branches to step 608. In step 608, the POI server system sends an interaction request directed towards the social network member associated with the selected PPOI.

For the next example of the system in use we have a user who is in Battery Park at the southern tip of Manhattan. They are looking at the Statue of Liberty and would like to post on social media that they are looking at the famous statue. The user might initiate a geogesture towards the Statue of Liberty and then the system could post to social media that the user was indeed looking at the Statue of Liberty. The system could also suggest various photos of the statue that could be added to the social media post that was initiated by the geogesture.

Other actions that could take place on a social network platform initiated by a geogesture could include other features. For example, a user selects a photograph from their library, and they would like to virtually attach the photograph to an object in the real world. They would geogesture at the object, such as a statue in a park, and then they select the statue from the list of POIs presented to them to attach the photo to. When others view information about the statue on the social network the user's photo that was attached to the statue with a geogesture will be visible. They could perform similar geogesture interactions, including but not limited to, attaching text, such as a review, to a POI, or attaching virtual gaming objects to real world POIs.

For a further example of the system in use a user might see an old friend from a distance at a convention. If the user wants to see what they have been up to, instead of having to search for their profile, even though they are already connected, the user can geogesture at their friend, who has allowed the social network to track their location and become a POI, and their friend's profile is then automatically shown to the user.

Another action the user could have initiated with a geogesture in the previous example would have been to identify his friend with a geogesture and send them their digital business card or contact information, along with their current geo-location, therefore alerting their friend that they were at the same convention and giving them a means to contact them. They could also initiate a chat with their friend after sending the information or initiate a chat after the geogesture identification without having to send any information.

For a further example, consider a person at a large venue, such as a county fair. The person might have plans to connect with other friends who are also attending the fair. Once inside the fairgrounds, the person could initiate a gesture such as a side-to-side slash geogesture that results initiating an interaction with a gesture area that is bounded by the fairgrounds. The result of the geogesture search might show that five of the user's friends are within the fairgrounds and the user can then send out a request for the users to all join a group chat while they are attending the fair. They all accept and begin to communicate and connect using the group chat set up on the remote server through the geogesture. Once this group has been established, it could be used to form a micro POI database and the users could also track the group and even initiate pointing geogestures towards their friends to interact with them. Messages may be sent only to members of the group who are in a certain direction and those messages could be transmitted using a geogesture. It is possible that friends of the user who arrive at the fairgrounds after the group has been established would be invited to join the group. It may also be the case that a user automatically leaves the group once they depart the confines of the fairgrounds. It may also be the case that the group may grow from the user's friends inviting their friends, friends that are not friends with the initial creator of the group, who are at the fair to join the group.

Security Actions and Interactions Initiated with a Geogesture

A geogesture of a mobile device may be used to initiate the unlocking of or interaction with various items or locations including, but not limited to, door or vehicle locks, cars, short-term bike or scooter rentals, bank lockers, garage door openers, storage units, boat battery power, hotel rooms, cabinets and workshop toolboxes, industrial furnaces, desktop computers, airport lounges and showers, motorized household blinds and window treatments, sound systems, lighting, household security system, etc.

A key chain type application running on a user's mobile phone could be used to aggregate objects that that user has authorization to interact with or unlock by geogesturing. When the user of such an application geogestures at, for example, his front door the system would display the front door lock, the interior hall lighting and the household security system since the location associated with each of these aggregated items is within the geographical area associated with the geogesture of the user's mobile device. The user of the system may then simply select those items to access or activate and/or deactivate. For specific high value items or items requiring a higher level of security additional security, such as a one-time random number code generation system could be used that would require the entry of such a code for a specific item before the item would unlock or otherwise be available for interaction, may be implemented. Such a key chain application would in effect make a user's mobile device a personal real-world universal remote alleviating the need to carry various fobs, keys, cards, etc., needed to unlock or interact with various items.

Another example of a geogesture being used to unlock or access would be that of a real estate agent tor giving a prospective buyer of a property a time sensitive, such as authorization to access for only a specific time period, randomly generated code to access by geogesture the lock of the property. In this way, the real estate agent need not be present in person and yet could still be certain as to whom accessed the property and when. Such a method could be used to give service people such as plumbers and electricians time sensitive access to homes, etc. without the property owner being present.

Real-Time Gesture Based Digital Handshake Methods

In another advanced version of the system, the interaction between participants may be controlled at the server level via a digital key or via a cloud-based distributed blockchain ledger. In the case of two people wanting to connect and message, and without asking for the other person's phone number, email, social IDs etc., a connection is made possible. At any point in time, either user can disconnect with no trace of actual contact information remaining on either participant's device.

Users may create multiple profiles based on application and usage, e.g., for friends, family, sport teams, a specific event, personal, or professional. These profiles may be preset or could be created/modified on the fly for each specific instance. A simple method for creating or modifying such profiles would be to have a list of possible information (social media ID, or other professional or social media applications, phone number, personal and professional snapchat, etc.) each with a switch or checkbox that could be clicked to approve that particular information being included in that communication with that person at that time or saved in that profile. A user of the system may also be presented with basic pre-set profiles for the most likely categories of contact (social, work, weekend, vacation, etc.) and these basic profiles may then be modified by the user to suit their personal preferences.

With the ability to identify users in close proximity via gesturing, the need for a phone number, email address, username, etc. becomes unnecessary. The system can maintain a much more highly secure lengthy digital ID that is internal to the system server database or web based blockchain hash. The system can then maintain the contact relationships as configured by the user in their profiles and as specifically shared. In addition, an updated database of individual contacts/relationships could also be compiled at a central server or via a distributed blockchain enabling a user to save specific user profiles of approved contact information relating to specific users of the system that have been interacted with previously. These system user specific profiles may be updated or modified by the user as desired. In this way, the user would be able to develop a set of contact information bookmarks specific to other users of the system.

These methods of generating and modifying profiles and saving and sharing contact information via server/blockchain may also eliminate the need to manually update such information on the other user's local phone whenever such information changes. For example, suppose a user A changes their primary email address and a user B desires to send an email to user A. User A's email address on user B's phone may simply be identified as "Work E-mail." Via the system server, the email would automatically be sent to the new primary email of user A seamlessly, and without user B needing to know the change of email address.

This method of contact and connection enables short term/long term contactless private and secure connections. And with the ability to disconnect without a trace, this can be highly useful for dating and friendship connections in the real world. A significant advantage of this method includes frictionless addition of contact information for everyday use.

The contact information to be sent may also be defined by a pre-set profile relating to the identity of the participant being geogestured at or the relationship of the participant being geogestured at to the user. It is often the case that a person has multiple methods of contact that either correspond to work, personal or other areas. It may be beneficial to be able to share only the pertinent information from a user's contact file with another user based on the nature of the relationship between the two users. When geogesturing towards a user with a connection or potential connection through a social network of a non-professional type, only the user's personal contact information would be shared, and if the users were connected or potentially connected through a professional social network, the user's work contact information might be shared with the other user.

For example, suppose user A geogestures at user B. The system can determine that user B is not known to user A socially, but does have a similar profession as user A. The system may then suggest a specific profile of business-related contact information, etc. (social media ID, company email, etc.) to be made available by user A to user B.

It also may be the case that sharing contact information through a geogesture with multiple people would be beneficial, and also the contact information shared with each user within the geogesture area of interest could correspond to the relationship each user had with the sending user. For example, while attending a convention, a user of the system notices a coffee shop across the street and begin to walk towards the shop. While walking, they geogesture towards the coffee shop to share their contact information with any potential contacts or friends. They have told the system to share work contact information with attendees of the convention who are venture capitalists (VCs) since they are seeking funding for a new venture, and to share their personal contact information with anyone they have a connection or potential connection with on non-professional social media. After the user geogestures towards the coffee shop, if a VC receives the user's work contact information, one of its employees, who is connected to the user through a non-professional social network might receive the user's personal contact information. This demonstrates how one geogesture may connect with multiple users and yet only share the relevant information with each user based upon individual connection parameters. Profiles/information to be made available may also be modified by (1) location (e.g., one or both users remain within a defined geographical area, such as at a convention), (2) proximity (the contact information might only be available to user A if they are within a distance threshold of user A or the location of user A when the contact was made and once this distance threshold is exceeded, all trace of the contact information, etc. might be deleted), and/or (3) time (the contact information might be only available for a set amount of time from initial contact or expires at a set time of day), etc. An application could be developed that leverages public profile APIs from social media services or transaction services, and aggregates them within a single peer-to-peer app. A user could create an account and then link their profiles on these social networks to it. If two users were logged into such an application and visible, to connect to each other in the app they could connect on those platforms if they were in close proximity to each other with the actual contact being controlled at the server level and specific contact information being kept confidential at the server level.

FIG. 7 is a flowchart 700 illustrating a possible mode of operation of a handshake system that provides secure and anonymous information sharing/communication system. In step 701, User A, who is a member of the handshake system contacts User B. This contact may be made via a cast/pointing as described in FIGS. 5 and 6 and associated text, via email, text or SMS, or other means. The flowchart then branches to step 702. In step 702, the handshake system determines if User B is known to the handshake system. In the case of a geogesture being used for contact, the location and hence a POI associated with User B would be known to the handshake system, User B might not be a user of the handshake system. If a text, email, or other contact means were being utilized for the initial contact, the location of User B would not have to be known to the handshake system for contact to be initiated. If User B is not a user of the handshake system, the flowchart then branches to step 703. If User B is a user of the handshake system, the flowchart then branches to step 706. In step 703, the handshake system prompts User B to become a user of the handshake system.

This prompting to become a user of the handshake system may be accomplished in a variety of ways including, but not limited to, an invite to join that is included in the initial contact message or sent as a second message, a prompt by the system to download an application to User B's mobile device, etc. User B may then go through the steps of becoming a user of the handshake system so as to facilitate the secure communication etc. between the two parties. The flow then branches to step 704, in which the handshake system determines if User B has become a user of the handshake system. If User B has become a user of the handshake system, the flow then branches to step 706. If User B has not become a user of the handshake system, the flow then branches to step 705, at which the handshake system prompts User A to communicate with User B via means outside the handshake system. In step 706, the handshake system determines if the handshake system has knowledge regarding prior interactions between User A and User B. If the handshake system does have knowledge regarding prior interactions between User A and User B, then the flow branches to step 707. If the handshake system does not have knowledge regarding prior interactions between User A and User B, then the flow branches to step 709. In step 707, the handshake system prompts User A to approve an information profile previously associated with User B. An information profile may contain one or more information types, such as email addresses, social media IDs, passwords or access codes, etc. that User A may want to make available to User B. The flow then branches to step 708, in which the handshake system determines if User A has selected a profile previously associated with User B. If User A has selected a profile previously associated with User B, the flow then branches to step 713 via connector 3. If User A has not selected a profile previously associated with User B, the flow then branches to step 709. In step 709, the handshake system determines if User A has one or more saved pre-set information profiles.

These profiles may be, for example, associated with types of social connection (friend, work, etc.) or other criteria. If User A does have one or more saved pre-set information profiles, the flow branches to step 710. If User A does not have one or more saved pre-set information profiles, the flow branches to step 712. In step 710, the handshake system prompts User A to select a saved pre-set information profile to be associated with User B. The flow then branches to step 711, in which the handshake system determines if User A has selected a saved pre-set information profile to be associated with User B. If User A does select a saved pre-set information profile, the flow branches to step 713 via connector 1. If User A does not select a saved pre-set information profile, the flow branches to step 712. In step 712, the handshake system presents User A with available information types and prompts User A to select the desired information types to be associated with User B. The flow then branches to step 713 via connector 2. In step 713, the handshake system stores and displays the approved information types in association with User A's identifiers (picture, name, etc.) on User B's device and makes those information types available for interaction by User B.

If, for example, User A had made their personal email address and social media ID available to User B as an information type, all that might be displayed to User B could be User A's identifiers and, perhaps, simple buttons titled "personal email" and "social media #1" and not the actual email address or ID. The approved information types etc. to be associated with User A may be stored at the server level, in a distributed cloud system or as part of a blockchain ledger, rather than on the mobile device of User B.

The flow then branches to step 714. In step 714, the handshake system determines if User A or User B has indicated a desire to break contact with the other. If User A or User B has indicated a desire to break contact with the other, then the flow branches to step 715 in which the handshake system deletes User B's access to User A's identifiers and associated information types and vice versa. If User A or User B has not indicated a desire to break contact with the other, then the flow branches to step 716. In step 716, the handshake system determines if one or more User A information types associated with User B are no longer in use by User A. If one or more such information types was no longer in use by User A, the flow then branches to step 717, in which the handshake system updates User A information types associated with User B and hence available for interaction on User B's devices. For example, if User A had deleted their particular social media account, then the interactive button for User A's account would be removed from User B's devices. If all such information types are still in use by User A, the flow then branches back to step 713.

FIG. 8 is flowchart 800 illustrating a possible mode of operation of a "handshake system initiated by a geogesture. In step 801, User A, who is a user of the handshake system, attempts to contact User B, also a user of the handshake system, via a geogesture. The flow then branches to step 802. In step 802, the handshake system determines if User B accepts the contact with User A. If User B does not accept the contact with User A, the flow then branches to step 803, in which the handshake system may inform User A that either a) there are no available system users in the area geogestured at (in this case User B has rejected the contact, but User A is not informed of the rejection), or b) user B has rejected the contact with User A.

The type of response received by User A may be a handshake system default (such as option "a" above in which User A receives no response from the handshake system) or may be selectable by User B (user B may wish user A to know that the contact request has been rejected). If User B does accept the contact with User A, the flow then branches to step 804. In step 804, the handshake system determines if the handshake system has knowledge regarding prior interactions between User A and User B. If the handshake system does have knowledge regarding prior interactions between User A and User B, then the flow branches to step 805. If the handshake system does not have knowledge regarding prior interactions between User A and User B, then the flow branches to step 807. In step 805, the handshake system prompts User A to approve an information profile previously associated with User B. An information profile may contain one or more information types, such as email addresses, social media ID's, passwords, or access codes, etc. that User A may want to make available to User B.

The flow then branches to step 806, in which the handshake system determines if User A has selected a profile previously associated with User B. If User A has selected a profile previously associated with User B, the flow then branches to step 811 via connector 6. If User A has not selected a profile previously associated with User B, the flow then branches to step 807. In step 807, the handshake system determines if User A has one or more saved pre-set information profiles. These profiles may be, for example, associated with types of social connection (friend, work, etc.) or other criteria. If User A does have one or more saved pre-set information profiles, the flow branches to step 808. If User A does not have one or more saved pre-set information profiles, the flow branches to step 810.

In step 808, the handshake system prompts User A to select a saved pre-set information profile to be associated with User B. The flow then branches to step 809, in which the handshake system determines if User A has selected a saved pre-set information profile to be associated with User B. If User A does select a saved pre-set information profile, the flow branches to step 811 via connector 4. If User A does not select a saved pre-set information profile, the flow branches to step 810. In step 810, the handshake system presents User A with available information types and prompts User A to select the desired information types to be associated with User B. The flow then branches to step 811 via connector 5. In step 811, the handshake system stores and displays the approved information types in association with User A's identifiers (picture, name, etc.) on User B's device and makes those information types available for interaction by User B.

If, for example, User A had made their personal email address and social media ID available to User B as an information type, all that would be displayed to User B would be User A's identifiers and, perhaps, simple buttons titled "personal email" and "social media" and not the actual email address or ID. The approved information types etc. to be associated with User A may be stored at the server level, in a distributed cloud system or as part of a blockchain ledger rather than on the mobile device of User B.

The flow then branches to step 812. In step 812, the handshake system determines if User A or User B has indicated a desire to break contact with the other. If User A or User B has indicated a desire to break contact with the other, then the flow branches to step 813 in which the handshake system deletes User B's access to User A's identifiers and associated information types and vice versa. If User A or User B has not indicated a desire to break contact with the other, then the flow branches to step 814. In step 814, the handshake system determines if one or more User A information types associated with User B are no longer in use by User A. If one or more such information types was no longer in use by User A, the flow then branches to step 815, in which the handshake system updates User A information types associated with User B and hence available for interaction on User B's devices. For example, if User A had deleted their particular social media account, then the interactive button for User A's social media ID would be removed form User B's devices. If all such information types are still in use by User A, the flow then branches back to step 811.

The methods described and illustrated in FIGS. 7 and 8 and related text need not be mutually exclusive and may be combined if desired.

Follows are possible specific examples of a handshake system and uses thereof.

Payment System Example 1

Connecting two users via a payment network or other payment applications using payment network ID's to enable a person-to-person payment might be done with User A sending a payment request to user B. User A selects their personal identifier (e.g., photograph, name, etc.) and payment network ID as the information to be shared via the system with user B's device. Via a geogesture, user B could be automatically presented with the payment request from the person in front of them and then a payment could be made. This transaction could be a one-time transaction, or the payee could be added to the payer's contact list for future payments but that the actual payment network ID of user A is not known to user B and is instead held at the server level. Even if the payee was already in the contact list, a geogesture could be simpler.

Payment System Example 2

Take a group of people who are at a location in proximity to each other and are willing to pay all or some of an expense such as a dinner bill. One of them geogestures at the other. The information about the matched PPOI is presented to the requesting user seeking a payment request, after getting a confirmation from the user that was geogestured at. Then the requesting user could make the payment. Alternately, the requesting user may make a payment with pointing after the confirmation is done by the responding user. In both these scenarios, the person who responds to the geogesture confirms they intend to share their profile information through the system in order to complete the transaction.

Some implementations of payment apps do reveal profile information to the other user in order to be searched and found. Using the method described in here, by geogesturing and with the user's permissions, their profiles can be connected for a transaction without the users actually seeing the ID. Users may only see a name and photo instead to confirm the matched results with the person in front of them.

Social Network Example

In a social network example, a user might request a connection with someone on a professional social network.

Figure 9:
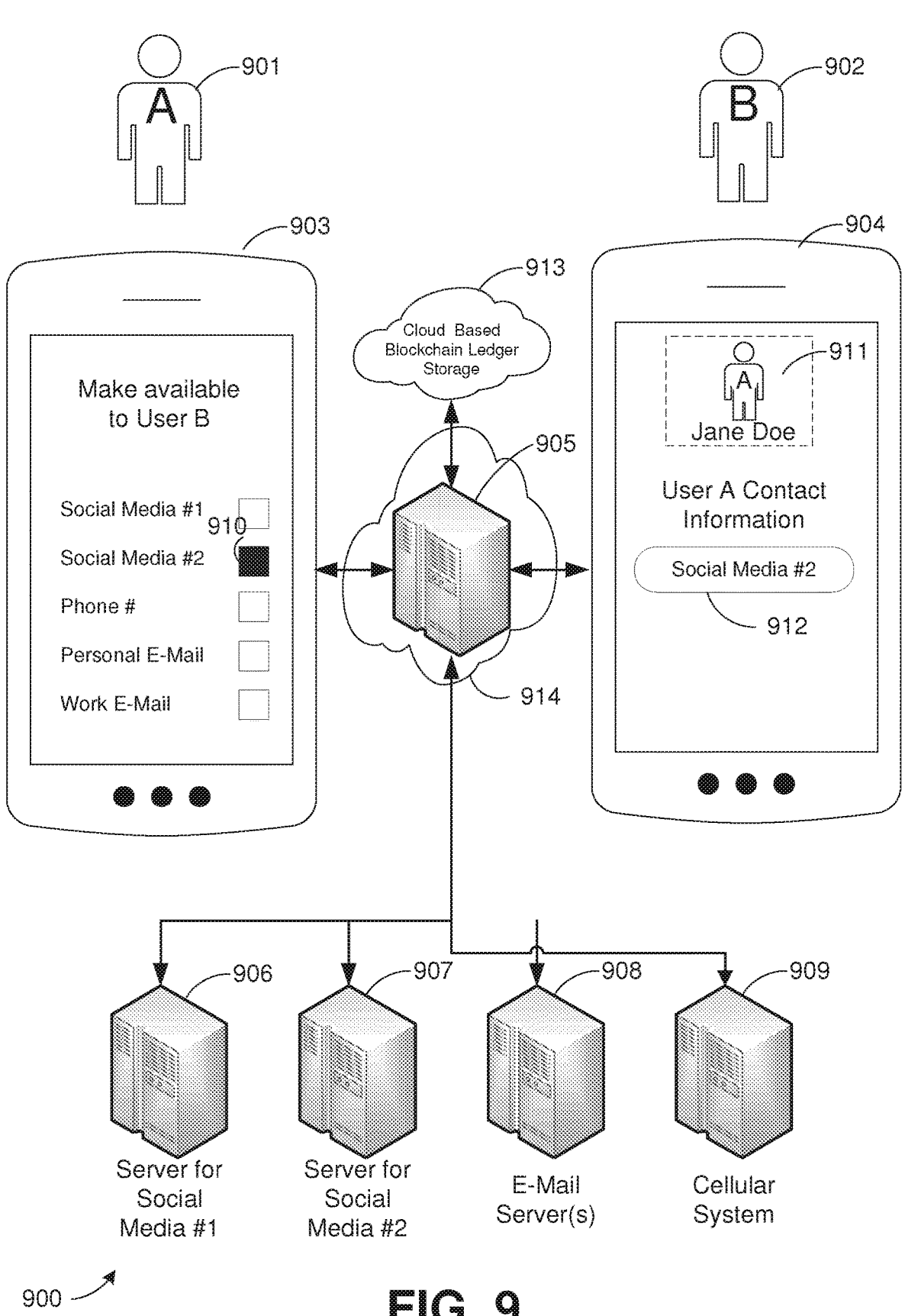
FIG. 9 is a diagram illustrating methods of the system in operation via mobile devices.

FIG. 9 is a diagram 900 illustrating a possible mode of operation of the system in such a situation. User A 901 desires to connect with user B 902 via that network. User A 901 selects their personal identifier (e.g., photograph, avatar, name, username, etc.) 911 and ID, by selecting the checkbox 910 associated with that network on the display of User A's mobile device 903, as the information to be shared via the system with user B's device 904. Via a geogesture, or other contact step, User B 902 could be presented with the contact request from the person in front of them and, if they approve the request, User A's personal identifier 911 (in this case an avatar and the name "Jane Doe") and a button 912 associated with User A's social media ID would be added to user B's profile of user A and displayed on User B's mobile device 904.

This profile may be held either at the system server 905 level, on User B's mobile device 904, as a cloud based 913 blockchain ledger entry maintained by networked systems, or a combination thereof. The system server 905 has been given proxy access, by User A, to User A's various information types (in this case a first social media ID 906, a professional social media ID 907, various email servers 908 and the cellular system 909) that User A subscribes to, is a member of, etc. and therefore the system server 905 may facilitate communications via that social media network between User A and User B. A centralized server might be used instead.

The actual social media ID of user A need not be known to user B, and vice versa, and can instead be held at the server level. The graphics being shown as displayed on the mobile devices 903 and 904 can be stylized and are used for illustrative purposes only. Different user interfaces or graphical user interfaces may instead be displayed. System server 905 may be one or more dedicated physical servers or may be a distributed cloud-based processing system 914.

These methods of holding information at server or cloud level and only making such information available to User B upon authorization from User A, and not making the actual information accessible to the users of such mobile devices, can apply beyond contact information such as email address, social media ID, financial system ID, etc. Other information that may be shared via such a system may include wireless network passwords, security codes to access physical areas or databases, meeting requests, and other data.

While the methods described above are illustrated in conjunction with a physical gesture of a mobile device, such as a geogesture, as an initiator of contact between participants the methods as described in FIG. 1 and associated text and elsewhere herein, they could be applicable to other means of interaction, such as near-field (Bluetooth, etc.), Wi-Fi, both devices on same local network, email, SMS, etc. These methods may enable a member of the system to set up, in effect, a "My Private Account" and if such a system was used for interaction between individuals and retailers such a system could in effect eliminate unwanted email, since the retailer would never have access to the actual email address, etc. of members of the system and hence would not be able to sell that information to aggregators.

If a user of the system wishes to message a person or group, they can open a system app and click on the contact (less) list instead of opening each individual app and messaging via those apps. An advantage of such a system could be that if a user of the system wishes to send a message to User A on one messaging platform and User B on another messaging platform, they can do that at once without opening individual apps separately and retyping/pasting the same information multiple times. Such a system can abstract the contact selection, and method of communication as chosen by the recipient for each of their contacts.

Smart watches and other wearables capable of sensing motions may be used to initiate a contactless handshake by gesturing or pointing at a nearby person with the arm on which the wearable device is present, pressing a button to confirm identity, and then generating a blink and/or beep on the wearable device, or mobile device such as a smart phone associated with the wearable device, of the person being gestured at. The responding person may then confirm the contact request by pushing a button on the wearable device or associated mobile device. Given the limited display size of most such wearable devices an audible (sound), tactile (vibration), or overt visual display (flashing lights) may be the desired method of initial interaction and/or confirmation with such devices.

In addition, existing methodologies of sharing contact information, etc. between devices and particularly mobile devices are typically very power hungry requiring the transmission of large data packets over wireless links. By holding the detailed information at the server level, only giving access of such information to the device via a secure key or blockchain hash and executing the requested transaction at the server level the need to transmit large data packets is kept to a minimum.

Commerce Actions and Interactions Initiated with a Geogesture

Mobile payments and electronic wallets (e-wallets) allow transactions to be completed with a variety of payment types such as linked bank accounts and credit cards, and cyber currencies such as Bitcoin. Adding a geogesture function to a transaction chain could be of benefit. These transactions could be completed using traditional financial institutions and methods or be completed peer-to-peer with no external involvement.

In one example, a traveler having a location-aware mobile device running a geogesture-enabled app might be traveling and want to pay for a public transport fare to take the public transport. They might notice a ferry terminal and execute a gesture towards the ferry terminal. Their device might send a geogesture request to a geogesture server and get back a set of POIs in the gesture area. From there, the traveler might scroll through a list of the matching set of POIs if more than one, and select the ferry terminal, assuming the ferry terminal operator or someone else has added a POI for the ferry terminal. The app might show the traveler the ferry schedule, the destinations, and the cost. This information can be translated into the traveler's preferred language. Using the app, the traveler can initiate a payment transaction and the ferry terminal operator's computer systems might opt to accept the initiation and be a respondent for a transaction. The payment might be by the traveler's e-wallet and a ticket might be provided to their mobile device usable to board the desired ferry.

It may also be the case that a second geogesture may be made towards the ferry terminal to send the desired payment. The transaction could be completed with one or with two geogestures. Other examples include paying for parking spaces, movie tickets, food, museum tickets, etc.

A commerce transaction might have multiple parts. For example, a person might use their smart device and its geogesture app to gesture towards a short-term rental scooter, select the scooter as one of the returned POIs and enter into a transaction with the scooter rental operator at a first location, whereby the scooter is unlocked and ready for riding. Once having ridden the scooter to a second location, at some time later, the person can make another gesture at a destination to close out the rental and cause a payment to be made to the scooter rental operator.

An initiator can be a payor, as in the above case, but can also be a prospective payee. For example, a musician might have scheduled an informal concert in a city park where people are free to stop and listen to the performance and might have advertised the performance on several social media platforms and have attendees who connected with the musician on that social media platform. Some might also be using geogesture-enabled apps and be connected to a geogesture server in common with the musician. Once the performance is over, or perhaps even in the middle of the show between songs, the musician can initiate a geogesture towards the audience and the geogesture server could provide a matching set of POIs that correspond to such users in the audience. The musician can then send out transaction requests to such users and those who are willing to connect can connect and perhaps provide a contribution. This may also be achieved by the user geogesturing towards the performer in response to the performer's geogesture to send the payment. It should be noted that users who had not allowed their location to be tracked but had checked in at the performance on social media could receive the geogesture for a contribution from the performer. One could also request money from an individual with a geogesture, for example somebody who owes you money or to split a check at a restaurant.

Another method of using a geogesture for commerce is the ability for a user to geogesture at a place of business and receive a coupon. A user sees a fast food restaurant and geogestures towards the building and they receive today's coupon, for example free French fries with any hamburger purchase. The coupon could also be tailored the specific user's demographic. For example, we have a user who is a vegetarian and have that noted in their profile that they have allowed the couponing application to access. They geogesture at the same fast food restaurant and request a coupon. The system, knowing they do not eat meat, generates a custom coupon for the user offering them one dollar off a veggie burger. The coupon generated from a geogesture could also be responsive to other factors including, but not limited to, time of day, seasons, weather, etc. The system would generate coupons for breakfast items during the morning hours or for hot drinks or warm clothes in the winter or during cold weather.

The system, perhaps with the permission of each individual user, may track the number of times a user had geogestured at a specific POI. For example, if the user in the previous example interacted with that fast food restaurant, perhaps also not just that specific location but all the restaurants in that fast food chain, frequently the restaurant or restaurant chain may choose to reward the user with a special offer. Perhaps a totally free meal after twenty-five geogesture interactions. This could function much like frequent flier miles or other loyalty or reward programs. Again, the offers generated with this method my take into account other factors including, but not limited to, individual user demographics, time of day, seasons, weather, etc.

Example of Transaction: Providing Offers and Coupons

Combining search technology based on a user's shopping list/needs/requirements, such as is disclosed in Ganesan I, with a gesture based geographical search may result in the generation of custom coupons or offers for specific items in a user list to be delivered to a motivated buyer from a motivated seller. Such an offer generation system could be member/vendor/supplier based and controlled.

A location associated with the coupon or offer may other than at the location of the POI. The coupon or offer may be located at the associated POI, as already described, but may also be located at or associated with another POI, e.g. a coffee shop coupon located at a famous monument or be its own unique POI. This could be used in a geographic game of hunting for coupons or offers accessible only via a gesture-based offer generation system with a limited number of high-value offers located around the globe. This could "gamify" couponing/advertising.

Offers, once created, could expire if the range from the POI associated with the offer to the location of the mobile device exceeds a pre-set threshold and is only available if the recipient remains within a pre-defined area. An offer could be such that the supplier will hold the item for a pre-set time and guarantee its availability for that time period, say 15 minutes, since the prospective purchaser is relatively close to the business. Once such an offer is received at a mobile device, the device may display a countdown clock informing the user as to how long before the offer expires. Such an offer may not offer a discount at all, just guaranteed availability. Customized coupons or offers may also be generated based on the user's demographics, time of day, season, weather, etc. at the time that a gesture based geographical search is initiated.

Figure 11:
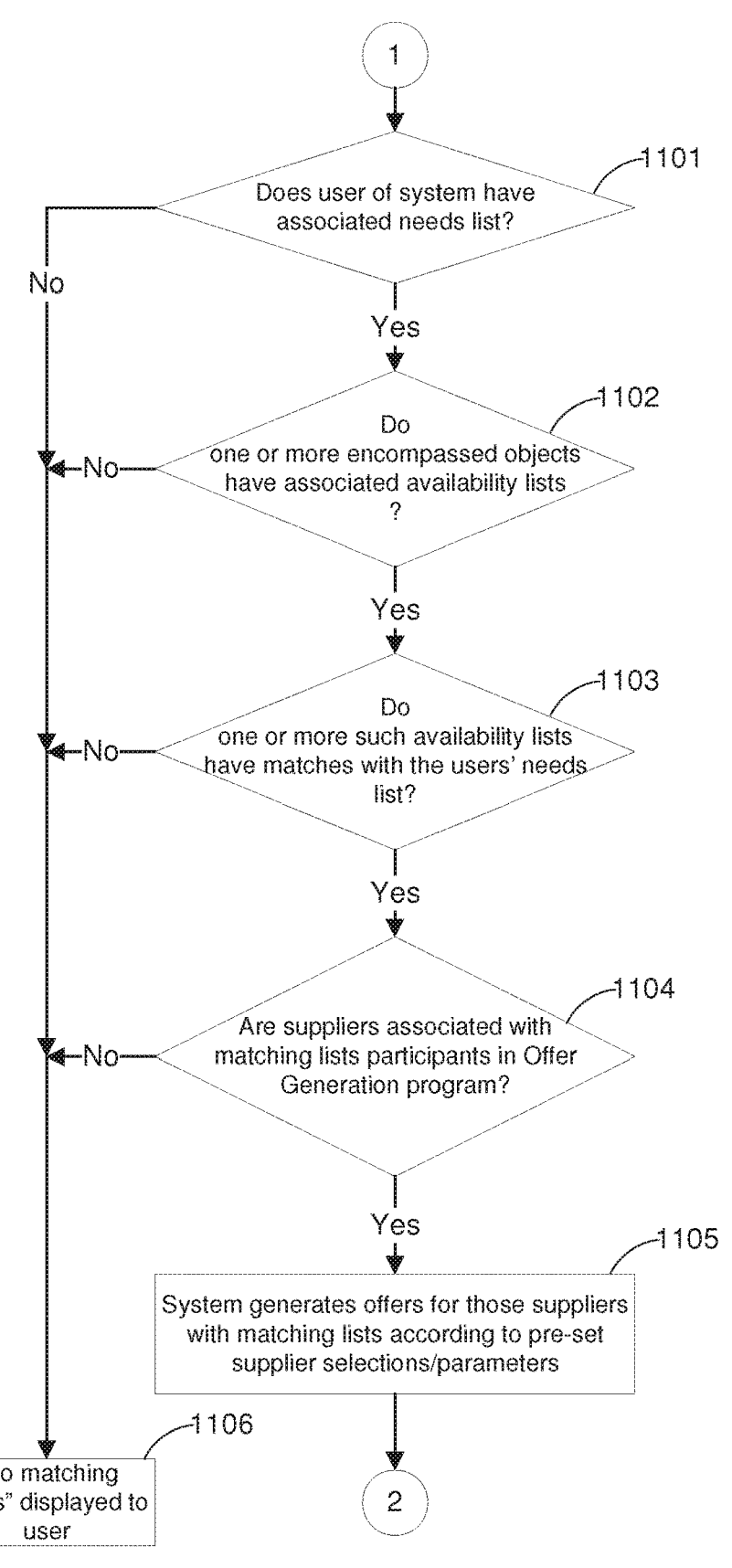
FIG. 11 is a flowchart illustrating a possible mode of operation of the system.

FIGS. 10 and 11 show flowcharts 1000, 1100, respectively, illustrating a possible mode of operation of an offer generation system. In step 1001 a user of such a system initiates a geographical search by gesturing with their mobile device. The flowchart then branches to step 1002. In step 1002 the system determines the parameters of the geographical search based upon the detected gesturing of the mobile device. Such parameters may include, but are not limited to, the rate of angular rotation in the vertical plane defining the distance to search out to, e.g. if the user gestures with their mobile device using a casting motion the search distance may be determined by comparing the detected vertical angular rotation of the mobile device to a table of pre-determined distances associated with various ranges of angular rotation. The flowchart then branches to step 1003. In step 1003 the system determines the position and orientation of the mobile device. The flowchart then branches to step 1004. In step 1004 the system located and orients a geographical search are in relation to the determined position and orientation of the mobile device and the determined parameters of the geographical search. The flowchart then branches to step 1005. In step 1005 the system compares the located and oriented geographical search are to a database of geolocated objects. The flowchart then branches to step 1006. In step 1006 the system determines if one or more geolocated objects are encompassed by, i.e. "within", the located and oriented geographical search area. If one or more geolocated objects are not encompassed by the located and oriented geographical search area, then the flowchart branches to step 1011 in which the system informs the user that no results have been returned. If one or more geolocated objects are encompassed by the located and oriented geographical search area then the flowchart branches to step 1007, the offer generation subsystem, via connector 1. In step 1101 the offer generation subsystem determines if the user of the system has an associated needs list. If the user of the system does not have an associated needs list the flowchart branches to step 1106 in which the user of the system is informed that there are no matching offers. If the user of the system does have an associated needs list the flowchart branches to step 1102. In step 1102 the system determines if one or more of the encompassed geolocated objects has an associated availability list. If one or more of the encompassed geolocated objects does not have an associated availability list the flowchart branches to step 1106 in which the user of the system is informed that there are no matching offers. If one or more of the encompassed geolocated objects does have an associated availability list the flowchart branches to step 1103. In step 1103 the system determines if one or more such availability lists have matches with the user's needs list. If one or more such availability lists do not have matches with the users' needs list the flowchart branches to step 1106 in which the user of the system is informed that there are no matching offers. If one or more such availability lists do have matches with the users' needs list the flowchart branches to step 1104. In step 1104 the system determines if one or more suppliers who have availability matches with the users' needs list participants in the Offer Generation program. If one or more such vendors are not participants in the Offer Generation program the flowchart branches to step 1106 in which the user of the system is informed that there are no matching offers. If one or more such vendors are participants in the Offer Generation program the flowchart branches to step 1105. In step 1105 the system generates offers for those suppliers with matching lists according to pre-set supplier selections/parameters. These pre-set supplier selections/parameters may include, but are not limited to, offers such as a percentage reduction in cost for such matching goods or services, a two for one offer for such matching goods or services, etc. The flowchart then branches to step 1008 via connector 2. In step 1008 the system displays the generated offers to the user. The flowchart then branches to step 1009 in which the user selects the desired offer and then branches to step 1010 in which the system transmits the offer details, etc. to the user's mobile device and informs the vendor that an offer has been made.

Another novel way to enact commerce actions and interactions via a geogesture would be to interact with ATMs. We have a user who is standing by an ATM and they launch the banking app that corresponds to the bank that owns the ATM, or is part of the ATM's network of financial institutions. All of the ATMs in the network are geolocated and therefore are POIs that the use can geogesture at and therefore interact with. The user performs a geogesture towards the ATM and is connected to the ATM via the app. They complete the transaction, requesting $200 cash from the ATM on their mobile device, not the ATM's interface, therefore negating the need to touch the ATM except the retrieve their cash, and in that instance they may only need to touch the cash, depending on the manner in which the ATM dispenses the bills to the user. Another way a user could interact with an ATM would be to geogesture at the ATM from a distance and complete the transaction request, in effect this would pre order your cash, and reserve it for you if the ATM was running low on bills, the ATM then dispensing the cash once that user is in proximity to the ATM and ID has been confirmed via RFID, Bluetooth, facial recognition, etc. The method of remote address of the ATM would also minimize the user's time spent at the ATM and streamline to process of getting cash.

Other transactions could be completed in a similar manner, such as interacting with vending machines that are POIs or stores and restaurants to pre-order products via geogesture and pick up upon arrival.

For the next example of the system in use we have a user who is on a vacation in Paris, France. While traveling about the city they use their mobile device to access information relating to the sights of Paris using geogestures. When they are shown information about a POI, the Eiffel Tower for example, they are not only shown the information about the tower, when it was built, its history and other information, but are given a link to shop for items pertaining to the Eiffel Tower. They may wish to purchase a book about, or a photograph of, the tower. All these items would be available for viewing and purchasing once the user has indicated interest in that POI via a geogesture. In this instance the user selects a book about the history and construction of the tower and places an order for the book to be delivered to their home address. There is no need for them to find a book shop or souvenir stand. Once the order is placed the system may also know when the user will be returning home and may ensure that order does not arrive while they are still on vacation, i.e. the system may delay the order to time the delivery to coincide with their return home.

Contactless Pay Overview and Use Cases

Systems and methods for enabling contactless and anonymized exchanges of confidential personal information disclosed in Ganesan II might be used.

A contactless mobile payment application (a "CP app") and digital payments platform might provide for payments to allow for in-person (offline) payment without requiring credit card readers, Near Field Communications ("NFC") devices or Quick Response ("QR") codes and related readers. These transactions may be made with a safe social distance between the two parties to limit possible exposure to infection, etc., further than with NFC and other technologies. The CP app may be used to make a payment to a merchant as well as to make person-to-person payments. CP users can associate any number of payment methods with which may be stored securely in the cloud via a payment gateway partner rather than locally in the app. A CP network might collect money from a payer and transfers the money to a payee once the transaction and funds availability is verified through a payment gateway.

The CP system might also be made available to third-party mobile payment applications and services through an API. Third parties can enable in-person contactless payments via geogesture in their existing mobile applications accessing a CP API and integrating it into the code of their applications.

Examples of Contactless Pay (CP) Processes

Payer downloads the Contactless Pay (CP) app, creates an account and associates one or more payment methods (credit card, debit card or bank account) with their CP account. Payee creates an account and designates the bank account into which they wish to receive payments. A Payee ID is created for the user. The Payee can associate a physical location, such as a lat/long coordinate pair, and business name with their account. This allows the Payee's business to be identified by a location search via geolocational search technology. The Payee can also be identified by the location of their mobile device when they are logged into their account and running the Contactless Pay app. This enables payments between two entities running the Contactless Pay app regardless of location since the Contactless Pay geolocation search technology can find and identify any user of Contactless Pay within a reasonably close proximity.

When a Payer wishes to make a payment to a Payee, the Payer opens the CP app and then points their mobile device at the Payee. Contactless Pay uses the GPS and compass within the mobile device to initiate a geographical search to either (1) identify the Payee ID and business name associated with the physical location or (2) identify Payee ID and name associated with the mobile device of the Payee via the CP app. The Payer is asked to confirm the identity of the Payee within the app. The Payer then enters the amount to pay and completes the transaction. The Payee then receives a confirmation in the app or via text. Alternatively, the Payee can send an "invoice" or request for payment to the Payer with the amount due via the Contactless Pay App and the Payer simply needs to confirm the payment.

Contactless Pay collects the payment from the Payer through a secure payment gateway (e.g. Authorize.net) and then transfers the funds to the Payee's account once the transaction is confirmed and funds are received through the payment gateway.

The CP app will also have an activity log to allow Payers to review their transaction history and allow Payees to see their collections history and confirmation of deposits (settlements) to their bank account, perhaps from an account maintained by the geogesture server operator.

Other Examples of CP Processes

In these examples, assume that the payor and payee are using the CP app described herein, each have accounts, and have set up a merchant profile where applicable, and that possibly the payer's credit card information has been entered and sent to a CP server via an API call or otherwise and has been saved under their ID.

Scenario 1: In-Person Person-to-Person, Payer Initiated

1. Payer opens CP app Home Screen and points their phone at the person they wish to pay who is also actively running the CP app.
2. A geolocational search identifies the mobile devices of CP users nearby and Payee's Profile (e.g. Photo & Name) is returned in the results of the pointing search (Results Screen). Payer selects the Payee from the results list to confirm the identity of the Payee. In most cases, only the intended Payee will be returned in results if the proximity field of the search is set to a low distance. Thus, in most cases the result is in effect a confirmation of the Payee's identity.
3. Payer is taken to the Payment Screen and enters amount to pay and can add a note to describe what the payment is for. Payer taps the Pay button to submit payment (uses an API call to PP servers).
4. Debit of funds are processed through our payment gateway and will be credited to Contactless Pay's merchant account
5. Payee receives confirmation of payment in the app and or via text/email depending on user preferences.
6. Transaction completes and payment is recorded in activity log of both payer and payee.
7. Contactless Pay will transfer funds to Payee's designated bank account within 24 hours.

Scenario 2: In-Person Person-to-Person, Payee Initiated

1. Payee opens CP app Home Screen and points their phone at the person (Payer) they wish to send a request for payment to who is also actively running the CP app.
2. A geolocational search identifies the mobile devices of CP users nearby and the Payer's Profile (e.g. Photo & Name) is returned in the results of the pointing search (Results Screen). Payee selects the Payer from within the results list to confirm the identity of the Payer. In most cases, only the intended Payer will be returned in results if the proximity field of the search is set to a low distance. Thus, the result is a confirmation of the Payer's identity.
3. Payee is taken to Payment screen and enters the amount they are requesting from the Payer and can enter a note to describe what the payment is for. Payee taps a Request Payment button to submit request (uses an API call to CP servers).
4. Payer receives a request for payment in the CP app's Home screen (e.g., via text) and taps on the request. Payer is taken to Payment screen.
5. Payer views the request which shows name, amount and any annotation and confirms payment by tapping the Pay button. (uses an API call to CP servers).
6. Debit of funds are processed through the payment gateway and will be credited to Contactless Pay's merchant account.
7. Payee receives confirmation of payment in the app and or via text/email depending on user preferences.
8. Transaction completes and payment is recorded in activity log of both payer and payee.
9. The server will transfer funds to Payee's designated bank account within 24 hours.

Scenario 3: Customer to Business—In-Person at Physical Store, Payer Initiated

1. Payer opens CP app Home Screen and points their phone within the business they wish to pay. Payee Business does not have to be running the CP app if the Business has created an account and specified the location of their store.

2. A geolocational search identifies the location of the of the POI associated with the Payee's Business and the Business name (and potentially additional information such as a Photo/Logo/etc.) is returned in the results of the pointing search. Payer selects the Payee from the results list to confirm the identity of the Payee. In most cases, only the intended Payee will be returned in results if the proximity field of the search is set to a low distance.

3. Payer is taken to the payment screen enters amount to pay provided by the Payee and can enter a note to describe what the payment is for. Payer taps a Pay button to submit payment.

4. Debit of funds are processed through our payment gateway and will be credited to Contactless Pay's merchant account 5. Payee receives confirmation of payment in the app and or via text/email depending on user preferences or can simply have Payer show a confirmation screen from their phone.

6. Transaction completes and payment is recorded in activity log of both payer and payee.

Contactless Pay will transfer funds to Payee's designated bank account within 24 hours.

Scenario 4: Customer to Business, Business Initiated

1. Payee (Business) opens CP app Home Screen and points their phone at the person (Payer) to whom they wish to send a request for payment who is also actively running the CP app.

2. A geolocational search identifies the mobile devices of CP users nearby and the Payer's Profile (e.g. Photo & Name) is returned in the results of the pointing search (Results Screen). Payee selects the Payer from within the results list to confirm the identity of the Payer. In most cases, only the intended Payer will be returned in results if the proximity field of the search is set to a low distance.

3. Payee is taken to Payment screen and enters the amount they are requesting from the Payer and can enter a note to describe what the payment is for. The notation can also include photos and serves as a receipt. The Payee taps a Request Payment button to submit request.

4. Payer receives a request for payment in the app's Home screen (and possibly via text, etc.) and taps on the request. Payer is taken to Payment screen.

5. Payer views the request which shows Business name, amount and any annotation and photos and confirms payment by tapping the Pay button. (uses an API call to PP servers).

6. Debit of funds are processed through our payment gateway and will be credited to Contactless Pay's merchant account 7. Payee receives confirmation of payment in the app and or via text/email depending on user preferences. Payer receives confirmation and receipt in app via API.

8. Transaction completes and payment is recorded in activity log of both payer and payee.

9. Contactless Pay will transfer funds to Payee's designated bank account within 24 hours.

Another similar use case involves Customer to Business transactions where the Business may not have a physical location (e.g. food truck, plumber, etc.) or may be performing a service for a customer at a location away from their place of business. In this scenario, uses cases are like P2P except Payee info displayed will be their Business profile. In these cases proximity is an important factor. For example, you can pay a plumber from your front porch while the plumber is sitting in their truck.

A CP app and/or API can be used for transactions with safe social distancing, which can be contactless, without requiring a chip or a camera, integrated into other apps, and proximity can be variable (e.g., a user can be outside the store or at the register to make payment or receive payment request). No Point of Sale ("POS") hardware is required. This can be used to make or request payments. The processes can be consumer-to-business or peer-to-peer.

Figure 12:
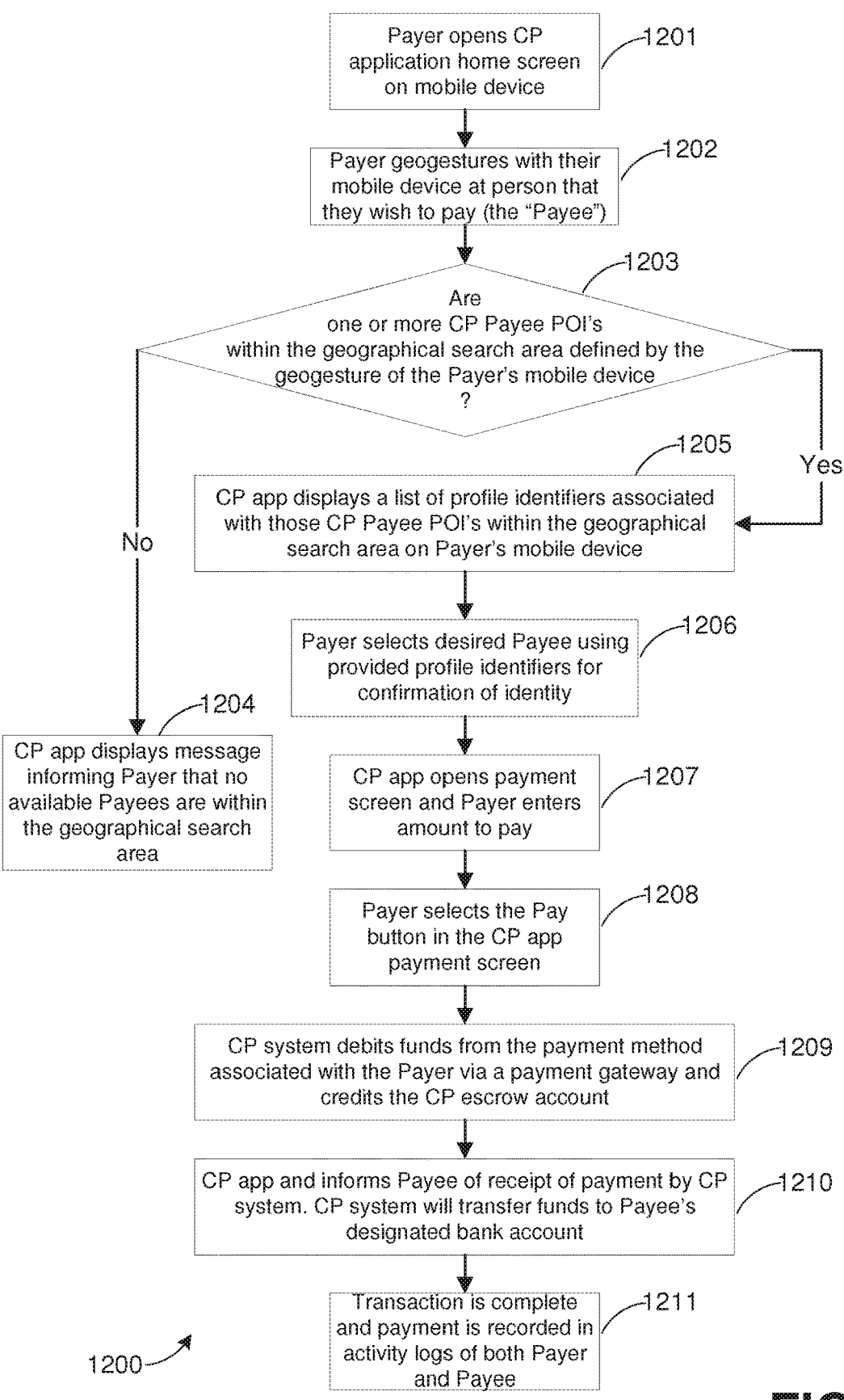
FIG. 12 is a flowchart illustrating a possible mode of operation of the system.

FIG. 12 is a flowchart 1200 illustrating scenario 1 above of the Contactless Pay application "In Person Person-Person, Payer Initiated". In step 1201 the Payer opens the CP app home screen in their mobile device. The flowchart then branches to step 1202. In step 1202 the Payer geogestures with their mobile device at the person they desire to pay (the "Payee"). The flowchart then branches to step 1203. In step 1203 the CP system determines if one or more available CP Payee POI's are within the geographical area defined by the geogesture of the Payers mobile device. These POI's may be the location of mobile devices running the CP app, as in this example, or may be physical POI's such as places of business, etc. associated with a CP app Payee. It should be noted here that the Payee at a minimum must be a member of the CP system, i.e. they need not have the CP app downloaded to a mobile device to participate in the CP system. If one or more available CP Payee POI's are not within the geographical area defined by the Payer geogesture then the flowchart branches to step 1204 in which the Payer is informed that there are no available CP Payees. If one or more available CP Payee POI's are within the geographical area defined by the Payer geogesture then the flowchart branches to step 1205. In step 1205 the CP app displays a list of Payee profile identifiers associated with those CP Payee POI's that are within the geographical area defined by the geogesture of the Payers mobile device. The Payee profile identifiers may include, but are not limited to, name, photograph, etc. The flowchart then branches to step 1206. In step 1206 the Payer selects the desired Payee using the provided Payee profile identifiers for confirmation that they are selecting the desired Payee. The flowchart then branches to step 1207 in which the CP app opens the payment screen and the Payer enters the amount to pay/transfer to the selected Payee. The flowchart then branches to step 1208 in which the Payer initiates the transfer by, for example, selecting a "Pay" button displayed in the payment screen of the CP app. The flowchart then branches to step 1209. In step 1209 the CP system debits funds form the payment method associated with the Payer via a payment gateway and credits the CP system escrow account. The flowchart then branches to step 1210 in which the CP app informs the Payee of the successful receipt by the CP system of the payment. The CP system will then transfer the funds within a set period of time to the designated bank or other financial institution/system designated by the Payee. This transfer to the Payee from the CP escrow account may be immediate or the CP system may aggregate all funds received over a time period, e.g. a 24 hour period, and then transfer the funds to the Payees it has received payment for at the end of that time period. The flowchart then branches to step 1211 in which the payment is recorded in the activity logs of both the Payer and the Payee. It should be noted that these payment logs may potentially contain more information than just the simple receipt of funds, i.e., the amount. If the Payee is a business the activity logs may also include an invoice and/or a receipt detailing the items, services, etc. purchased by the Payer. Such a detailed invoice or receipt may be available for searching by the Payer and/or the Payee. For example, if the Payer desires to purchase the same or a similar product, service, etc. at a later date but has forgotten whom they purchased it from or when they could have the CP app search the receipts recorded in their activity log to find the desired product or service and hence the vendor they purchased it from. It should also be noted that the log may also include coupons/offers from the Payee.

If the Payee in the above example a user of an instant messaging ("IM") application, they may have a list of contacts within that app. The CP app may cross reference the results returned from the initial geolocational search with the Payers IM contact list(s) and if any members of the Payers IM contact list(s) have been returned as a result of the geolocational search they may be treated in a preferential manner such as being listed first in the results list (typically the results would be listed closest to farthest from the determined location of the Payers mobile device).

Figure 13:
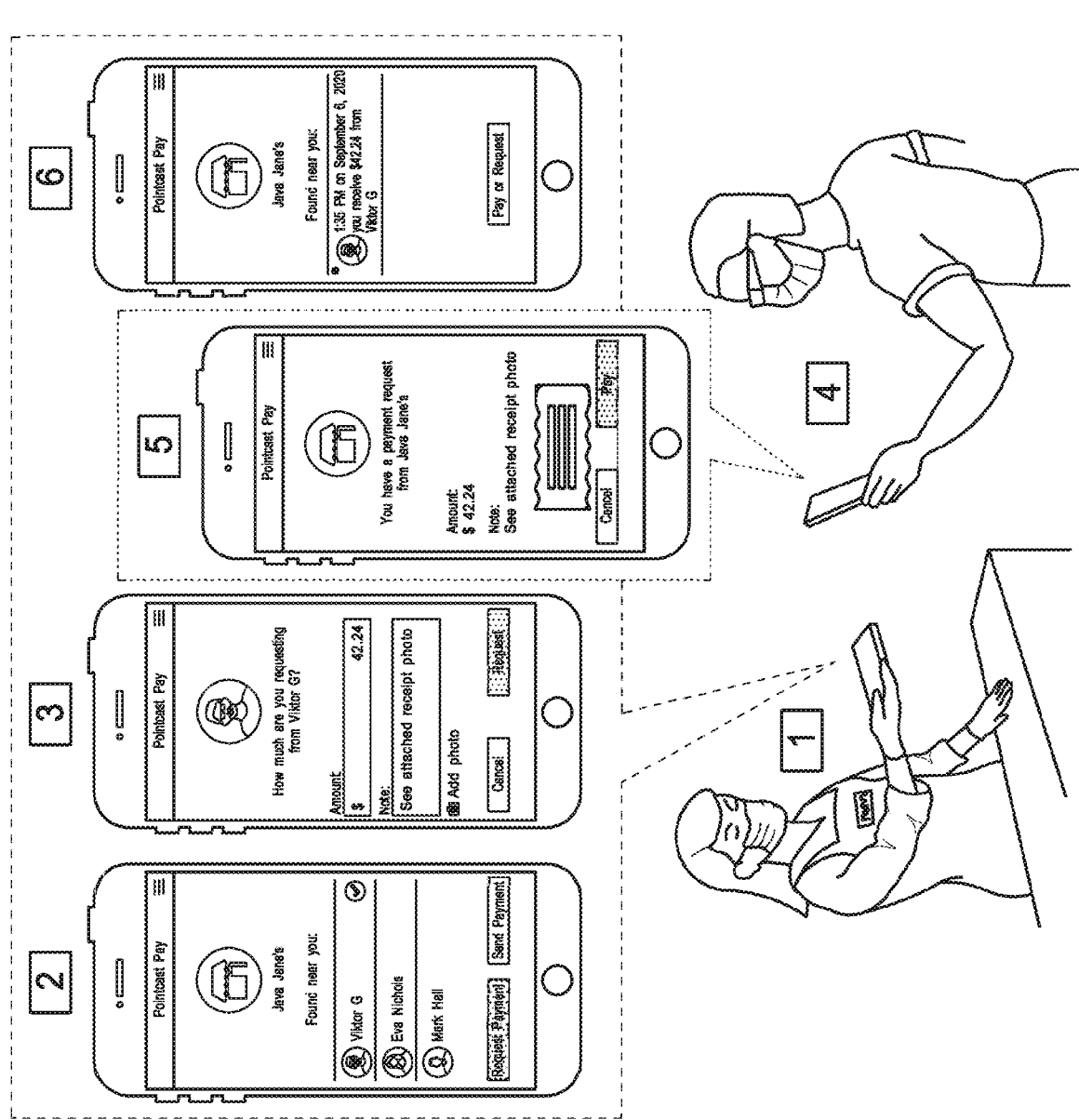
FIG. 13 is a diagram illustrating methods of the system in operation via mobile devices.

FIG. 13 is a diagram illustrating methods of the system in operation via mobile devices as described in scenario 1 above and FIG. 12 and related text and more specifically the process of one individual requesting payment from another via the system.

Figure 14:
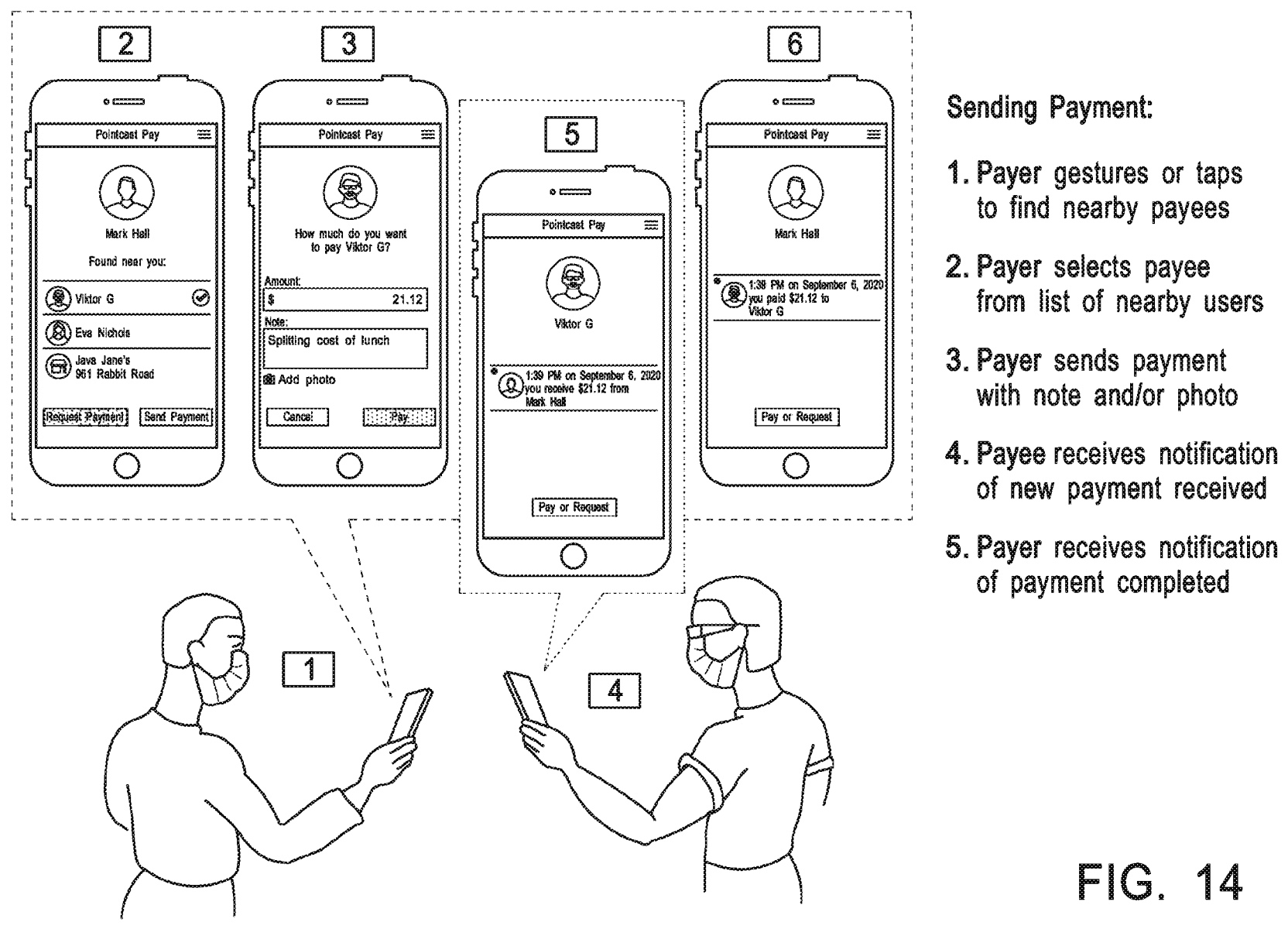

FIG. 14 is a diagram illustrating methods of the system in operation via mobile devices as described in scenario 1 above and FIG. 12 and related text and more specifically the process of one individual sending payment to another via the system.

In an alternate method a payer/shopper is shopping in a large store. The shopper can take their aggregated purchases to a checkout within the store. The items might have been scanned by the shopper. The shopper then desires to pay for the items with the CP app. The CP system determines that the location of the shopper is within a geographical area, in this case the geographical footprint of the store itself, that is associated with a CP Payee account, i.e., the store operator's CP Payee account. The shopper confirms the amount, selects pay and receives a receipt that may be displayed on their mobile device once the CP system confirms receipt of the funds from the shopper in the CP escrow account. Alternately there may be a location or locations within the store that are designated as "Contactless Pay Points", such as a wall sign or structure, that could be geogestured at remotely to initiate the CP payment. Other examples of a structure that may be designated as a Contactless Pay Point could include the locations of cash registers within the store, light poles, etc. With the ability to scan barcodes of products using the camera of a mobile device the entire transaction could be completed securely for both parties without requiring the shopper to actually go to a physical checkout location at all. The shopper simply scans the bar codes of the items they wish to purchase and the CP app generates an invoice for the store and prompts the shopper to initiate the CP payment by pointing at the nearest Contactless Pay Point. Upon completion of the transaction the shopper would receive a receipt and be on their way with no interaction with store staff required.

Figure 16:
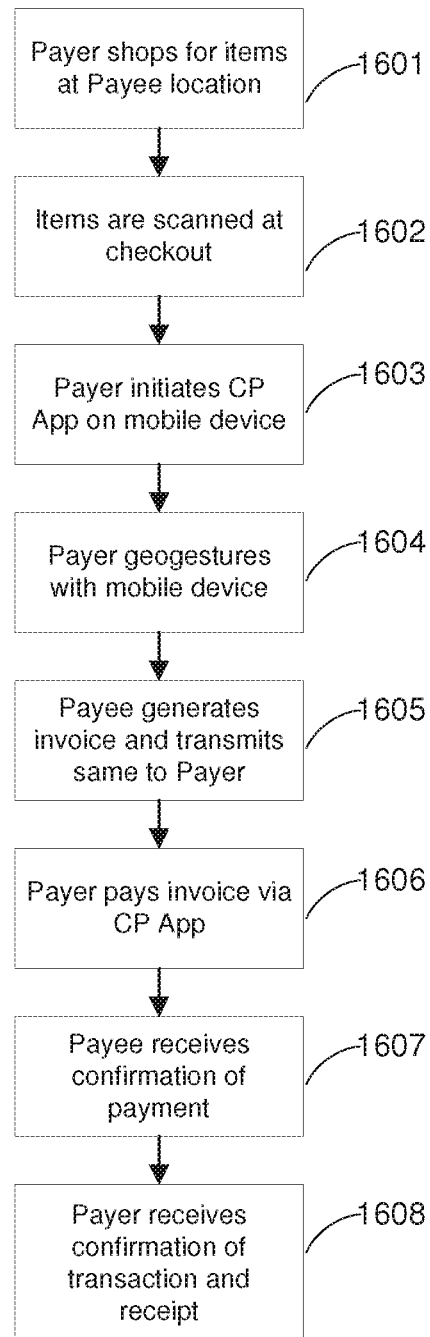
FIG. 16 is a flowchart illustrating a possible mode of operation of a CP application.

FIG. 16 is a flowchart 1600 illustrating a possible mode of operation of the CP application. In step 1601 the Payer shops for items at a location associated with a Payee known to the CP system. The flowchart then branches to step 1602. In step 1602, the items the Payer has selected are scanned for purchase. This may be done at a checkout counter or by some other means such as near field, etc. If the scanning of the items for purchase was indeed being done at a checkout counter, the Payer would inform the Payee employee at the checkout counter of the desire to pay via the CP app. The flowchart then branches to step 1603. In step 1603 the Payer initiates the CP app on their mobile device. The flowchart then branches to step 1604. In step 1604 the Payer geogestures with their mobile device. The geogesture might be made towards the checkout counter but, as previously described, there may be a specific geographical location or locations (i.e., CP App POI's) within a shop that are associated with the CP App. The flowchart then branches to step 1605. In step 1605 the Payee generates an invoice and transmits the invoice to the Payer via the CP App. The flowchart then branches to step 1606. In step 1606 the Payer pays the invoice via the CP App. The flowchart then branches to step 1607. In step 1607 the Payee receives confirmation of the payment. The flowchart then branches to step 1608. In step 1608 the Payer receives confirmation of the transaction and a receipt. The receipt may be a physical printed out, a digital receipt, or both. It The various transactions of the CP App may be accomplished via a CP API that may be integrated into a Payee's own application.

Figure 17:
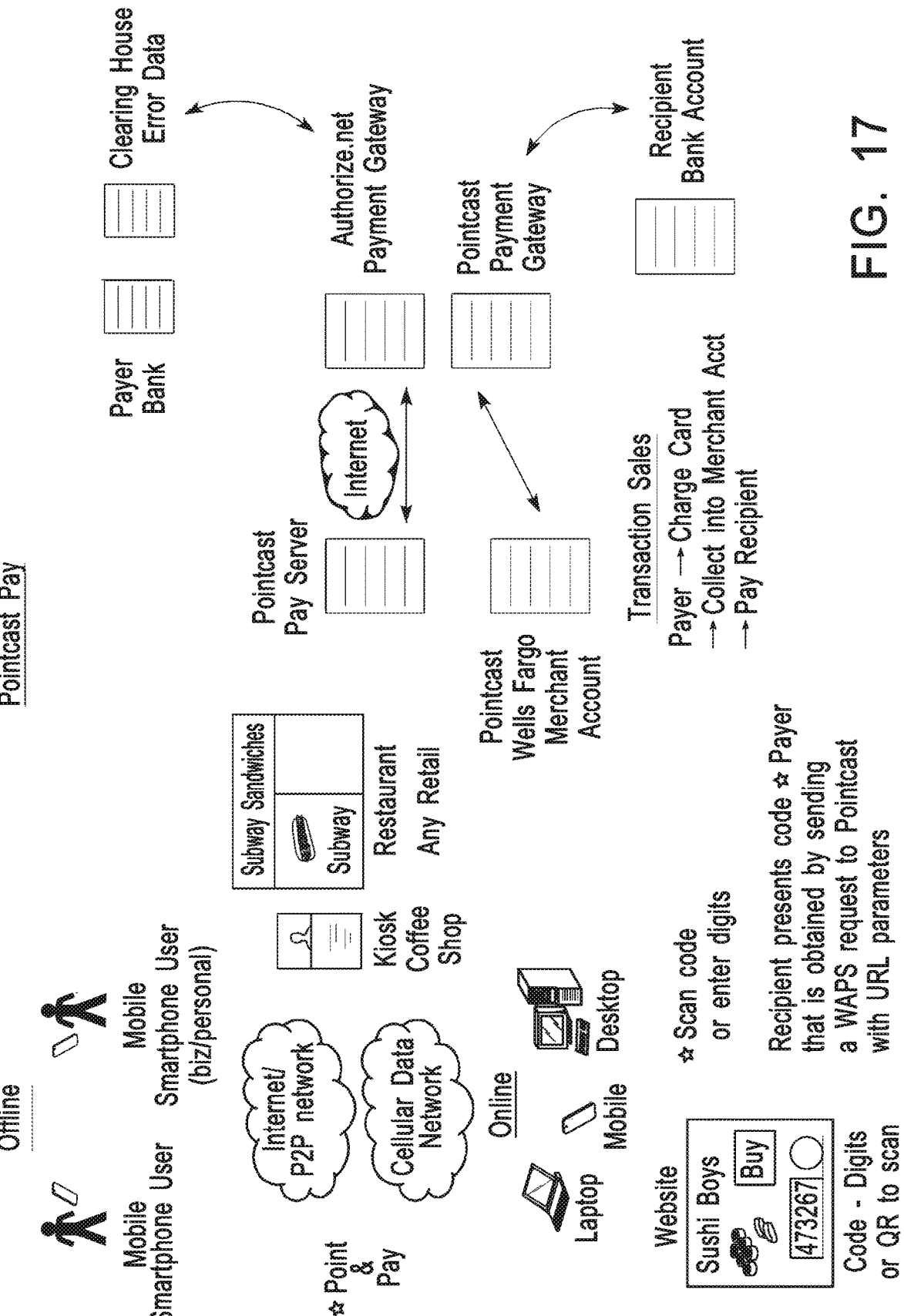
FIG. 17 illustrates aspects of an embodiment.

FIG. 17 illustrates aspects of an embodiment.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 15:
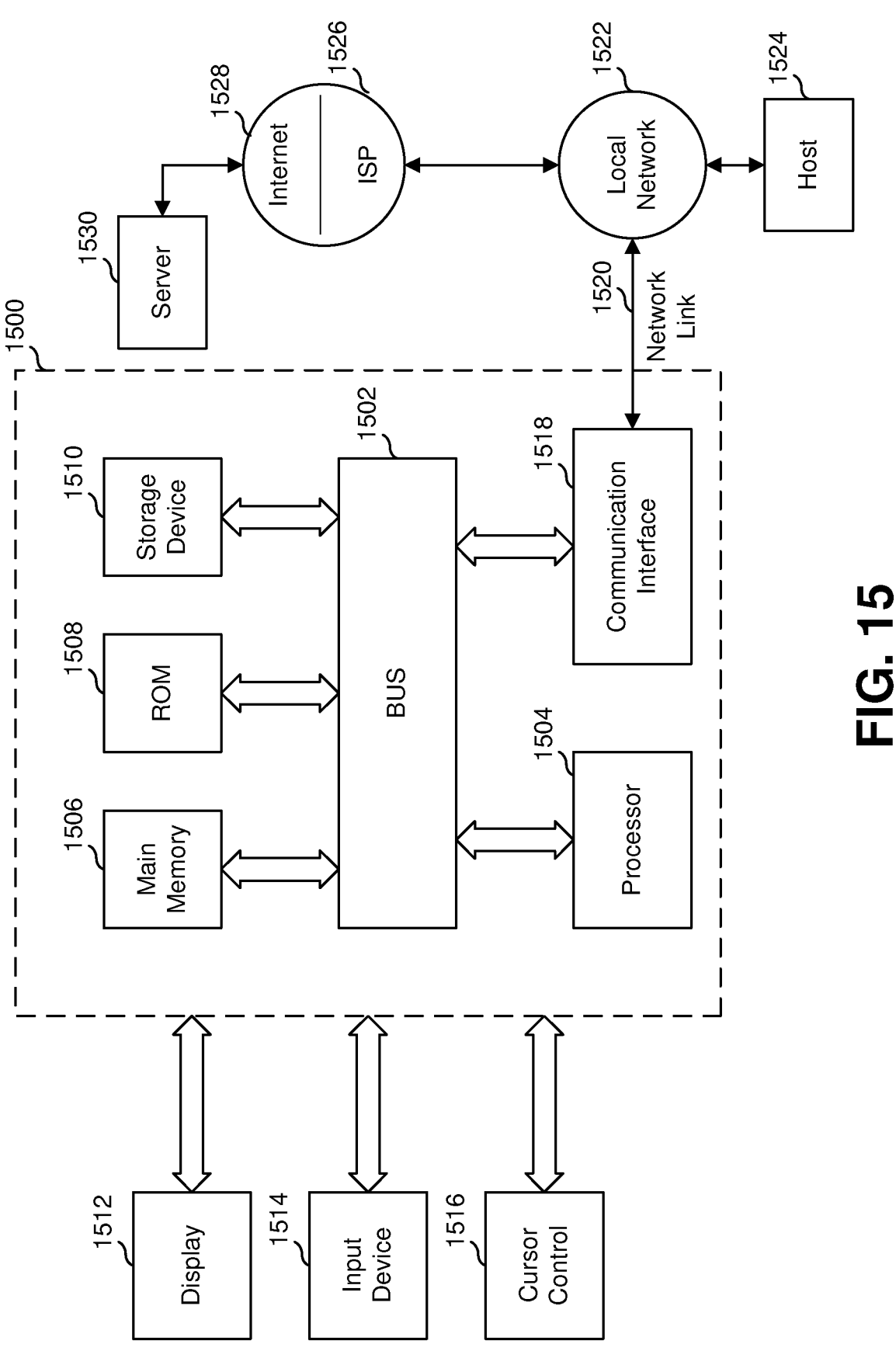
FIG. 15 is a block diagram of computer elements as might be used.

For example, FIG. 15 is a block diagram that illustrates a computer system 1500 upon which the computer systems of the systems described herein may be implemented. Computer system 1500 includes a bus 1502 or other communication mechanism for communicating information, and a processor 1504 coupled with bus 1502 for processing information. Processor 1504 may be, for example, a general-purpose microprocessor.

Computer system 1500 also includes a main memory 1506, such as a random-access memory (RAM) or other dynamic storage device, coupled to bus 1502 for storing information and instructions to be executed by processor 1504. Main memory 1506 may also be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a computer monitor, for displaying information to a computer user. An input device 1514, including alphanumeric and other keys, is coupled to bus 1502 for communicating information and command selections to processor 1504. Another type of user input device is a cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a network connection. A modem or network interface local to computer system 1500 can receive the data. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be a network card, a modem, a cable modem, or a satellite modem to provide a data communication connection to a corresponding type of telephone line or communications line. Wireless links may also be implemented. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic, or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520, and communication interface 1518. In the Internet example, a server 1530 might transmit a requested code for an application program through the Internet 1528, ISP 1526, local network 1522, and communication interface 1518. The received code may be executed by processor 1504 as it is received, and/or stored in storage device 1510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for secure communication interactions, wherein a communication interaction comprises a communication among a plurality of connected users, each connected user using an associated communication device via one or more communication modes, the method comprising:

accepting, from a first user device associated with a first user of the plurality of connected user devices at a communication server, a first indication of a desire to communicate with a second user device associated with a second user of the plurality of connected user devices for a first communication interaction session via at least one preferred communication mode selected from the one or more communication modes;

associating, at the communication server, the first user device with a first unique identifier that is independent of a first user profile of the first user;

prompting the second user via the second user device, from the communication server, to accept a request to participate in the first communication interaction session;

associating, at the communication server, the second user device with a second unique identifier that is independent of a second user profile of the second user; and receiving, from the second user device, a second indication of an intent to participate in the first communication interaction session;

initiating the first communication interaction session by:

(a) computing a first geogesture area based on a first geogesture performed by the first user using the first user device, wherein the first geogesture comprises an orientational movement of the first user device in a first geographical location of the first user device;

(b) computing a second geogesture area based on a second geogesture performed by the second user using the second user device, wherein the second geogesture comprises an orientational movement of the second user device in a second geographical location of the second user device; and (c) determining that the first geogesture area overlaps with the second geogesture area in determining whether to initiate the first communication interaction session; and in response to receiving the second indication, establishing, at the communication server, a user-to-user communication channel for a particular communication mode selected from the at least one preferred communication mode without requiring disclosure of the first unique identifier associated with the first user device or the second unique identifier associated with the second user device.

2. The method of claim 1, wherein either the first user or the second user requests terminating, at the communication server, the particular communication mode based on a user profile of the first user, the second user, or both.

3. The method of claim 2, wherein the termination of the particular communication mode is initiated by a third geogesture performed by the first user using the first user device, or the second user using the second user device.

4. The method of claim 1, wherein the first communication interaction session comprises at least one social interaction and commercial interaction.

5. A system for secure communication interactions, comprising at least one computing device configured to implement one or more services, wherein a communication interaction comprises a communication among a plurality of connected users, each connected user using an associated communication device via one or more communication modes, the one or more services configured to:

accept, from a first user device associated with a first user of the plurality of connected user devices at a communication server, a first indication of a desire to communicate with a second user device associated with a second user of the plurality of connected user devices for a first communication interaction session via at least one preferred communication mode selected from the one or more communication modes;

associate, at the communication server, the first user device with a first unique identifier that is independent of a first user profile of the first user;

prompt the second user via the second user device, from the communication server, to accept a request to participate in the first communication interaction session;

associate, at the communication server, the second user device with a second unique identifier that is independent of a second user profile of the second user; and receive, from the second user device, a second indication of an intent to participate in the first communication interaction session;

initiate the first communication interaction session by:

(a) computing a first geogesture area based on a first geogesture performed by the first user using the first user device, wherein the first geogesture comprises an orientational movement of the first user device in a first geographical location of the first user device;

(b) computing a second geogesture area based on a second geogesture performed by the second user using the second user device, wherein the second geogesture comprises an orientational movement of the second user device in a second geographical location of the second user device; and (c) determining that the first geogesture area overlaps with the second geogesture area in determining whether to initiate the first communication interaction session; and in response to receiving the second indication, establish, at the communication server, a user-to-user communication channel for a particular communication mode selected from the at least one preferred communication mode without requiring disclosure of the first unique identifier associated with the first user device or the second unique identifier associated with the second user device.

6. The system of claim 5, wherein either the first user or the second user requests terminating, at the communication server, the particular communication mode based on a user profile of the first user, the second user, or both.

7. The system of claim 6, wherein the termination of the particular communication mode is initiated by a third geogesture performed by the first user using the first user device.

8. The system of claim 5, wherein the first communication interaction session comprises at least one social interaction and commercial interaction.

9. A non-transitory computer-readable storage medium having stored thereon executable instructions that secure communication interactions, wherein a communication interaction comprises a communication among a plurality of connected users, each connected user using an associated communication device via one or more communication modes, when the executable instructions are executed by one or more processors of a computer system, the executable instructions cause the computer system to at least:

accept, from a first user device associated with a first user of the plurality of connected user devices at a communication server, a first indication of a desire to communicate with a second user device associated with a second user of the plurality of connected user devices for a first communication interaction session via at least one preferred communication mode selected from the one or more communication modes;

associate, at the communication server, the first user device with a first unique identifier that is independent of a first user profile of the first user;

prompt the second user via the second user device, from the communication server, to accept a request to participate in the first communication interaction session;

associate, at the communication server, the second user device with a second unique identifier that is independent of a second user profile of the second user; and receive, from the second user device, a second indication of an intent to participate in the first communication interaction session;

initiate the first communication interaction session by:

(a) computing a first geogesture area based on a first geogesture performed by the first user using the first user device, wherein the first geogesture comprises an orientational movement of the first user device in a first geographical location of the first user device;

(b) computing a second geogesture area based on a second geogesture performed by the second user using the second user device, wherein the second geogesture comprises an orientational movement of the second user device in a second geographical location of the second user device; and (c) determining that the first geogesture area overlaps with the second geogesture area in determining whether to initiate the first communication interaction session; and in response to receiving the second indication, establish, at the communication server, a user-to-user communication channel for a particular communication mode selected from the at least one preferred communication mode without requiring disclosure of the first unique identifier associated with the first user device or the second unique identifier associated with the second user device.

10. The storage medium of claim 9, wherein either the first user or the second user requests terminating, at the communication server, the particular communication mode based on a user profile of the first user, the second user, or both.

11. The storage medium of claim 10, wherein the termination of the particular communication mode is initiated by a third geogesture performed by the first user using the first user device.

* * * * *